(12) United States Patent
Oasa

(10) Patent No.: US 11,326,324 B2
(45) Date of Patent: May 10, 2022

(54) WORK VEHICLE AND CONTROL METHOD FOR WORK VEHICLE

(71) Applicant: KOMATSU LTD., Tokyo (JP)

(72) Inventor: Takahisa Oasa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 263 days.

(21) Appl. No.: 16/627,096

(22) PCT Filed: Jan. 21, 2019

(86) PCT No.: PCT/JP2019/001648
§ 371 (c)(1),
(2) Date: Dec. 27, 2019

(87) PCT Pub. No.: WO2019/163356
PCT Pub. Date: Aug. 29, 2019

(65) Prior Publication Data
US 2020/0199850 A1 Jun. 25, 2020

(30) Foreign Application Priority Data

Feb. 23, 2018 (JP) .............................. JP2018-030735

(51) Int. Cl.
*E02F 9/22* (2006.01)
*B60W 10/06* (2006.01)
(Continued)

(52) U.S. Cl.
CPC ........... *E02F 9/2253* (2013.01); *B60W 10/06* (2013.01); *B60W 10/18* (2013.01);
(Continued)

(58) Field of Classification Search
CPC ..... E02F 9/2253; E02F 9/2235; E02F 9/2246; B60W 10/06; B60W 10/18;
(Continued)

(56) References Cited

U.S. PATENT DOCUMENTS 5,784,883 A 7/1998 Ohkura et al.
2007/0289639 A1 12/2007 Haramoto et al.
(Continued)

FOREIGN PATENT DOCUMENTS

CN 107532409 A 1/2018
CN 107532618 A 1/2018
(Continued)

OTHER PUBLICATIONS

The International Search Report for the corresponding international application No. PCT/JP2019/001648, dated Mar. 19, 2019.
(Continued)

*Primary Examiner* — Edwin A Young
(74) *Attorney, Agent, or Firm* — Global IP Counselors, LLP

(57) ABSTRACT

The controller determines whether the vehicle is in a shuttle motion from the operating position of the forward/reverse travel operating member and the actual traveling direction of the vehicle. The controller determines a target braking force when the vehicle is in the shuttle motion. The controller determines at least one of a target displacement of the travel pump and a target displacement of the travel motor based on the target braking force.

12 Claims, 15 Drawing Sheets

(51) Int. Cl.
  *B60W 10/18* (2012.01)
  *B60W 30/18* (2012.01)
  *F16H 61/425* (2010.01)
  *F16H 61/435* (2010.01)

(52) U.S. Cl.
  CPC ..... *B60W 30/18063* (2013.01); *E02F 9/2235* (2013.01); *E02F 9/2246* (2013.01); *F16H 61/425* (2013.01); *F16H 61/435* (2013.01); *B60W 2300/17* (2013.01); *B60W 2520/06* (2013.01); *B60W 2520/10* (2013.01); *B60W 2540/10* (2013.01); *B60W 2710/06* (2013.01); *B60W 2710/18* (2013.01); *B60W 2720/10* (2013.01)

(58) Field of Classification Search
  CPC ..... B60W 30/18063; B60W 30/18045; B60W 2300/17; B60W 2520/096; B60W 2520/10; B60W 2540/10; B60W 2710/06; B60W 2710/18; B60W 2720/10; F16H 61/425; F16H 61/435; F16H 2059/088
  See application file for complete search history.

(56) References Cited

U.S. PATENT DOCUMENTS

| | | |
|---|---|---|
| 2009/0238696 A1 | 9/2009 | Satake et al. |
| 2010/0083652 A1 | 4/2010 | Fukuda et al. |
| 2012/0271519 A1 | 10/2012 | Nishi et al. |
| 2013/0000288 A1 | 1/2013 | Ho et al. |
| 2013/0239558 A1 | 9/2013 | Shirao |
| 2014/0323268 A1* | 10/2014 | Ishikawa ................ E02F 9/226 477/52 |
| 2015/0098783 A1* | 4/2015 | Hyodo ................ F02D 41/021 414/685 |
| 2015/0337877 A1 | 11/2015 | Miyamoto et al. |
| 2016/0145836 A1 | 5/2016 | Yamada et al. |
| 2016/0257538 A1 | 9/2016 | Oiwa et al. |
| 2017/0370382 A1 | 12/2017 | Kondo et al. |
| 2018/0016770 A1 | 1/2018 | Honda et al. |
| 2018/0119386 A1 | 5/2018 | Kobayashi et al. |

FOREIGN PATENT DOCUMENTS

| | | |
|---|---|---|
| CN | 107614896 A | 1/2018 |
| JP | 2008-164096 A | 7/2008 |
| JP | 2013-190088 A | 9/2013 |
| JP | 2015-140727 A | 8/2015 |
| WO | 03/091606 A1 | 11/2003 |
| WO | 2015/056492 A1 | 4/2015 |

OTHER PUBLICATIONS

The extended European search report for the corresponding European application No. 19757799.2, dated Jan. 26, 2021.
The Office Action for the corresponding Chinese application No. 201980003602.3, dated Jan. 29, 2021.

* cited by examiner

WORK VEHICLE AND CONTROL METHOD FOR WORK VEHICLE

CROSS-REFERENCE TO RELATED APPLICATIONS

This application is a U.S. National stage application of International Application No. PCT/JP2019/001648, filed on Jan. 21, 2019. This U.S. National stage application claims priority under 35 U.S.C. § 119(a) to Japanese Patent Application No. 2018-030735, filed in Japan on Feb. 23, 2018, the entire contents of which are hereby incorporated herein by reference.

BACKGROUND

Field of the Invention

The present invention relates to a work vehicle and a control method for a work vehicle.

Background Information

A work vehicle may be provided with a hydrostatic transmission. A hydrostatic transmission includes a travel pump, a hydraulic circuit, and a travel motor. The travel pump is driven by an engine and discharges hydraulic fluid. The hydraulic fluid discharged by the travel pump is supplied to the travel motor through the hydraulic circuit. The travel motor is connected to a travel device of the work vehicle and the work vehicle travels due to the travel motor being driven. A transmission gear ratio can be controlled in the hydrostatic transmission by controlling the displacement of the travel pump and the displacement of the travel motor.

SUMMARY

FIG. 16 illustrates a portion of a drive system of a work vehicle according to the prior art. As illustrated in FIG. 16, the travel pump 101 is controlled by a pump control cylinder 103 and a pump control valve 103. The pump control cylinder 102 changes the discharge direction and the displacement of the travel pump 101 in response to a pilot pressure inputted from the pump control valve 103. In a first state P1, the pump control valve 103 supplies the pilot pressure to the pump control cylinder 102 so that the pump control cylinder 102 moves to a forward travel position. In a second state P2, the pump control valve 103 supplies the pilot pressure to the pump control cylinder 102 so that the pump control cylinder 102 moves to a reverse travel position.

A shuttle motion for switching the traveling direction during travel is often employed in a work vehicle such as a wheel loader. For example, an operator switches forward/reverse travel lever from the forward travel position to the reverse travel position while the work vehicle is traveling forward. At this time, a controller of the work vehicle switches the discharge direction of the travel pump by switching the pump control valve from the first state P1 to the second state P2. Consequently, the traveling direction of the work vehicle is switched from forward travel to reverse travel.

Under the above conditions, there is a concern that a shock may occur to the vehicle when the skew plate angle of the travel pump is switched quickly in order to switch the discharge direction of the travel pump. Consequently, a throttle 105 is provided in a return circuit 104 of the pump control valve 103 in the work vehicle according to the prior art as illustrated in FIG. 16. Due to the throttle 105, a sudden change in the skew plate angle of the travel pump 101 can be suppressed because the pump control cylinder 102 is actuated gently during the switching of the pump control valve 103. As a result, the vehicle speed in the forward traveling direction gradually decelerates and reaches zero and then the traveling direction of the vehicle switches from forward travel to reverse travel.

However, in the above configuration, the control of the travel pump during the shuttle motion is effected by the throttle. Therefore, it is not easy to improve the responsiveness of the control of the travel pump during the shuttle motion. In addition, the throttle may be a factor in response delay during normal operations and not just during the shuttle motion. Furthermore, it is difficult to adjust the intensity of the shuttle motion by operating the accelerator. In order to improve responsiveness on the control of the travel pump and/or the travel motor during the shuttle motion, it is desirable to accurately achieve motions of the vehicle that conform to the intent of the operator.

An object of the present invention is to accurately achieve motions of the vehicle that conform to the intent of the operator while suppressing the occurrence of shock during a shuttle motion.

A work vehicle according to a first aspect is provided with an engine, a travel pump, a hydraulic circuit, a travel motor, a forward/reverse travel operating member, a forward/reverse travel operating sensor, and a traveling direction sensor. The travel pump is driven by the engine. The hydraulic circuit is connected to the travel pump. The travel motor is connected to the travel pump through the hydraulic circuit. The forward/reverse travel operating sensor outputs a signal indicating an operating position of the forward/reverse travel operating member. The traveling direction sensor outputs a signal indicating an actual traveling direction of the vehicle. A controller receives the signals from the forward/reverse travel operating sensor and the traveling direction sensor and controls the travel pump and the travel motor. The controller determines whether the vehicle is in a shuttle motion from the operating position of the forward/reverse travel operating member and from the actual traveling direction of the vehicle. The controller determines a target braking force when the vehicle is in the shuttle motion. The controller determines a target displacement of the travel pump and/or a target displacement of the travel motor based on the target braking force.

In the work vehicle according to the present aspect, the target displacement of the travel pump and/or the target displacement of the travel motor are determined based on the target braking force determined by the controller when the vehicle is in the shuttle motion. As a result, shock during the shuttle motion can be suppressed by setting a desired target braking force and not by a throttle. As a result, the responsiveness of the control of the travel pump and/or the travel motor during the shuttle motion can be improved in comparison to the case of suppressing shock with the throttle. Consequently, motions of the vehicle that conform to the intent of the operator can be achieved with accuracy while suppressing the occurrence of shock during the shuttle motion.

The work vehicle may be further provided with an accelerator operating member and an accelerator operating sensor. The accelerator operating sensor may output a signal indicating an operating amount of the accelerator operating member. The controller may receive the signal from the accelerator operating sensor. The controller may determine the target braking force in response to the operating amount of the accelerator operating member.

In this case, the braking force during the shuttle motion can be controlled in response to the operation of the accelerator operating member by the operator. As a result, motions of the vehicle that conform to the intent of the operator can be achieved with accuracy.

The controller may refer to target braking data and determine the target braking force from the operating amount of the accelerator operating member. The target braking data may define the relationship between the target braking force and the operating amount of the accelerator operating member. In this case, the braking force during the shuttle motion can be controlled in response to the characteristics of the target braking data.

The controller may receive a signal indicating the actual vehicle speed. The controller may determine a target vehicle speed during the shuttle motion from the elapsed time from the starting time of the shuttle motion, the actual vehicle speed, and the target braking force. The controller may determine the target displacement of the travel pump from the target vehicle speed during the shuttle motion. In this case, the vehicle speed of the work vehicle can be controlled with accuracy in response to the elapsed time from the starting time of the shuttle motion.

The controller may bring the target vehicle speed during the shuttle motion close to zero in response to the elapsed time from the starting time of the shuttle motion. In this case, the work vehicle can be decelerated gradually during the shuttle motion. As a result, the occurrence of a shock can be suppressed.

The controller may store a displacement instruction for the travel pump at the starting time of the shuttle motion. The controller may determine the target displacement for the travel pump by reducing the displacement instruction for the travel pump at the starting time of the shuttle motion in response to the target braking force and the elapsed time from the starting time of the shuttle motion, thereby. In this case, the target displacement of the travel pump is reduced gradually from the displacement at the starting time of the shuttle motion. Consequently, the occurrence of shock at the starting time of the shuttle motion can be suppressed.

The hydraulic pump may include a first pump port and a second pump port. The travel motor may include a first motor port and a second motor port. The hydraulic circuit may include a first circuit that connects the first pump port and the first motor port, and a second circuit that connects the second pump port and the second motor port. The work vehicle may include a first pressure sensor and a second pressure sensor. The first pressure sensor may output a signal indicating the hydraulic pressure in the first circuit. The second pressure sensor may output the signal indicating the hydraulic pressure in the second circuit. The controller may receive the signal from the first pressure sensor and the signal from the second pressure sensor. The controller may acquire an actual differential pressure between the first circuit and the second circuit from the signal from the first pressure sensor and the signal from the second pressure sensor. The controller may determine the target displacement of the travel motor from the target braking force and the actual differential pressure.

In this case, the displacement of the travel motor can be controlled based on the target braking force and the actual differential pressure, whereby a desired braking force can be achieved. Consequently, motions of the vehicle that conform to the intent of the operator can be achieved with accuracy.

The controller may receive a signal indicating an actual vehicle speed. The controller may reduce the target braking force in response to a drop in the actual vehicle speed. In this case, the target braking force becomes smaller as the work vehicle is reduced and the shuttle motion approaches completion. Consequently, the work vehicle can be stopped smoothly and the traveling direction can be switched.

The controller may refer to braking upper limit data which defines the relationship between the actual vehicle speed and an upper limit of the target braking force, and may determine the upper limit of the target braking force from the actual vehicle speed. In this case, the braking force during the shuttle motion can be controlled in response to the characteristics of the braking upper limit data.

The controller may determine that the vehicle is in a shuttle motion when the operating position of the forward/reverse travel operating member and the actual traveling direction of the vehicle do not match. In this case, the fact that the vehicle is in a shuttle motion can be determined with accuracy.

The work vehicle may be further provided with an inching operating member and an inching operating sensor. The inching operating sensor may output a signal indicating an operating amount of the inching operating member. The controller may receive the signal from the inching operating sensor. The controller may determine the target braking force in response to the operating amount of the inching operating member.

In this case, the braking force during the shuttle motion can be controlled in response to the operation of the inching operating member by the operator. As a result, motions of the vehicle that conform to the intent of the operator can be achieved with accuracy.

The controller may refer to target braking data and determine the target braking force from the operating amount of the inching operating member. The target braking data may define the relationship between the operating amount of the inching operating member and the target braking force. In this case, the braking force during the shuttle motion can be controlled in response to the characteristics of the target braking data.

A method according to a second aspect is a method performed with a controller for controlling a work vehicle. The work vehicle is provided with an engine, a travel pump, a hydraulic circuit, a travel motor, and a forward/reverse travel operating member. The travel pump is driven by the engine. The hydraulic circuit is connected to the travel pump. The travel motor is connected to the travel pump through the hydraulic circuit. The control method according to the present aspect includes the following processes.

A first process involves receiving a signal indicating an operating position of the forward/reverse travel operating member. A second process involves receiving a signal indicating an actual traveling direction of the work vehicle. A third process involves determining whether the work vehicle is in the shuttle motion from the operating position of the forward/reverse travel operating member and the actual traveling direction of the vehicle. A fourth process involves determining a target braking force when the work vehicle is in the shuttle motion. A fifth process involves determining a target displacement of the travel pump and/or a target displacement of the travel motor based on the target braking force.

In the method according to the present aspect, when the work vehicle is in the shuttle motion, the target displacement of the travel pump and/or the target displacement of the travel motor is determined based on the target braking force determined by the controller. As a result, shock during the shuttle motion can be suppressed by setting a desired target braking force and not by a throttle. As a result, the responsiveness of the control of the travel pump and/or the travel motor during the shuttle motion can be improved in comparison to the case of suppressing shock with the throttle. Consequently, motions of the vehicle that conform to the intent of the operator can be achieved with accuracy while suppressing the occurrence of shock during the shuttle motion.

According to the present invention, motions of the vehicle that conform to the intent of the operator can be achieved with accuracy while suppressing the occurrence of shock during the shuttle motion.

DETAILED DESCRIPTION OF EMBODIMENT(S)

Figure 1:
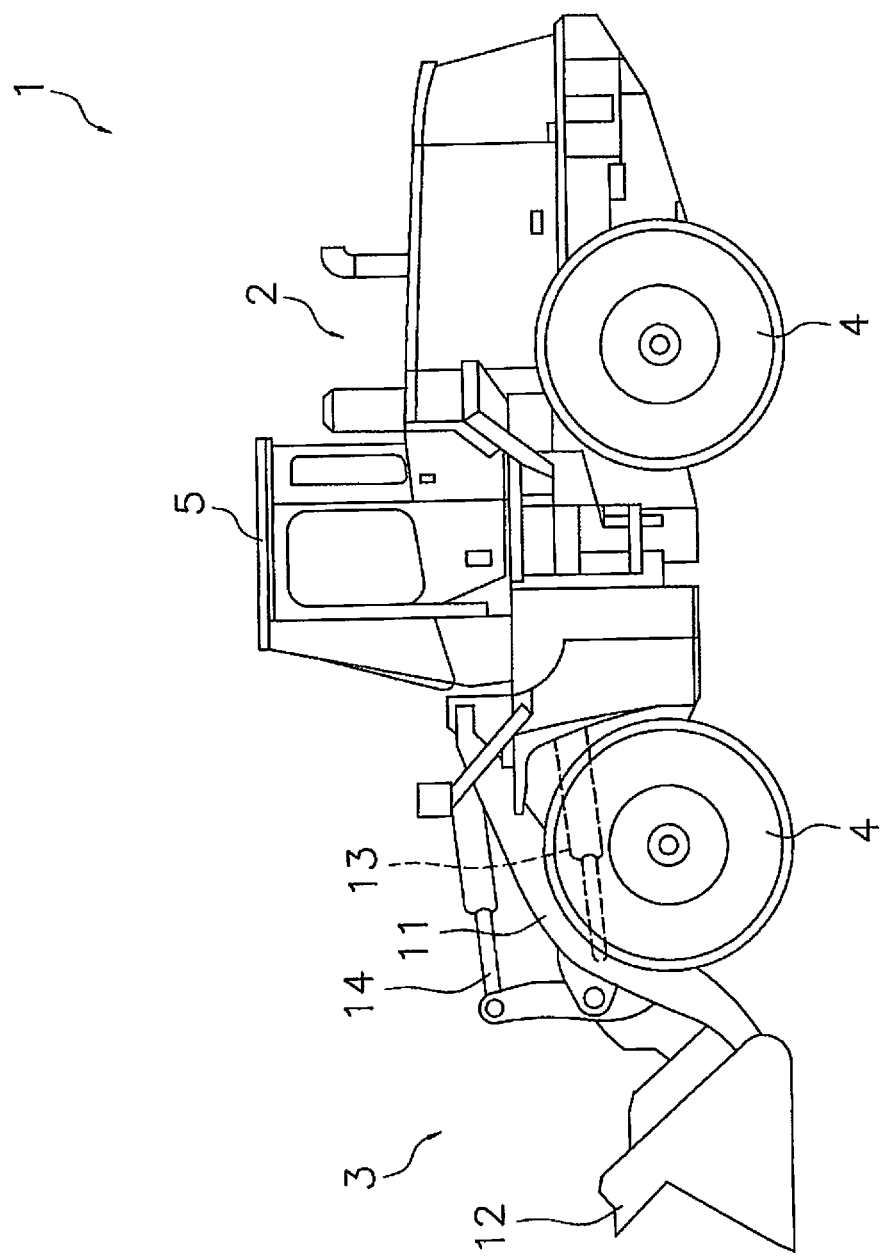
FIG. 1 is a side view of a work vehicle according to an embodiment.

Herein, a work vehicle 1 according to a first embodiment of the present invention will be explained in reference to the drawings. FIG. 1 is a side view of the work vehicle 1. The work vehicle 1 is a wheel loader. The work vehicle 1 includes a vehicle body 2, a work implement 3, a plurality of traveling wheels 4, and a cab 5. The working implement 3 is mounted onto a front portion of the vehicle body 2. The working implement 3 includes a boom 11, a bucket 12, a lifting cylinder 13, and a bucket cylinder 14.

The boom 11 is rotatably attached to the vehicle body 2. The boom 11 is driven by the lift cylinder 13. The bucket 12 is rotatably attached to the boom 11. The bucket 12 moves up and down by means of the bucket cylinder 14. The cab 5 is disposed on the vehicle body 2. The plurality of traveling wheels 4 are rotatably attached to the vehicle body 2.

Figure 2:
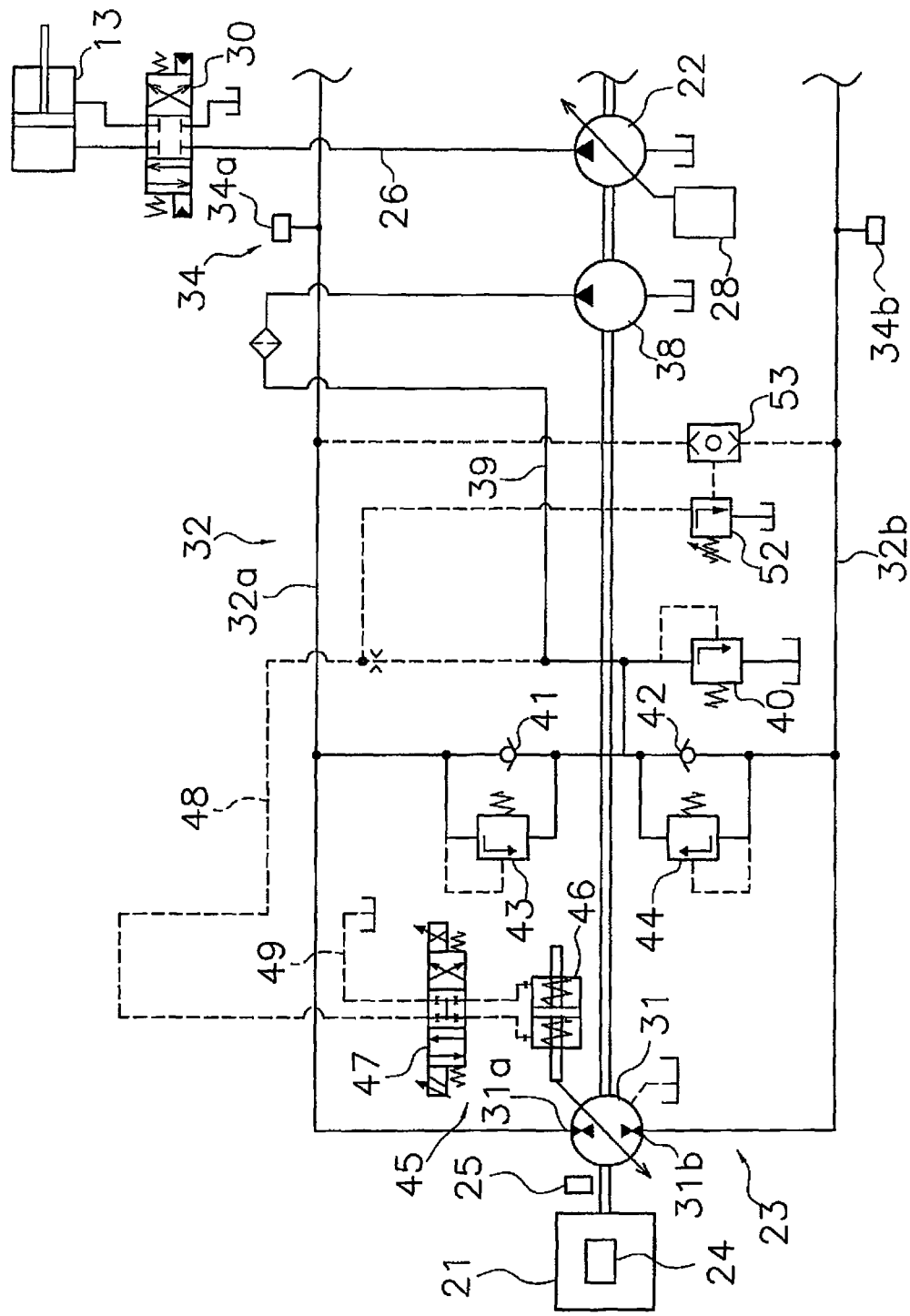
FIG. 2 is a block diagram illustrating a configuration of a drive system of the work vehicle.
Figure 3:
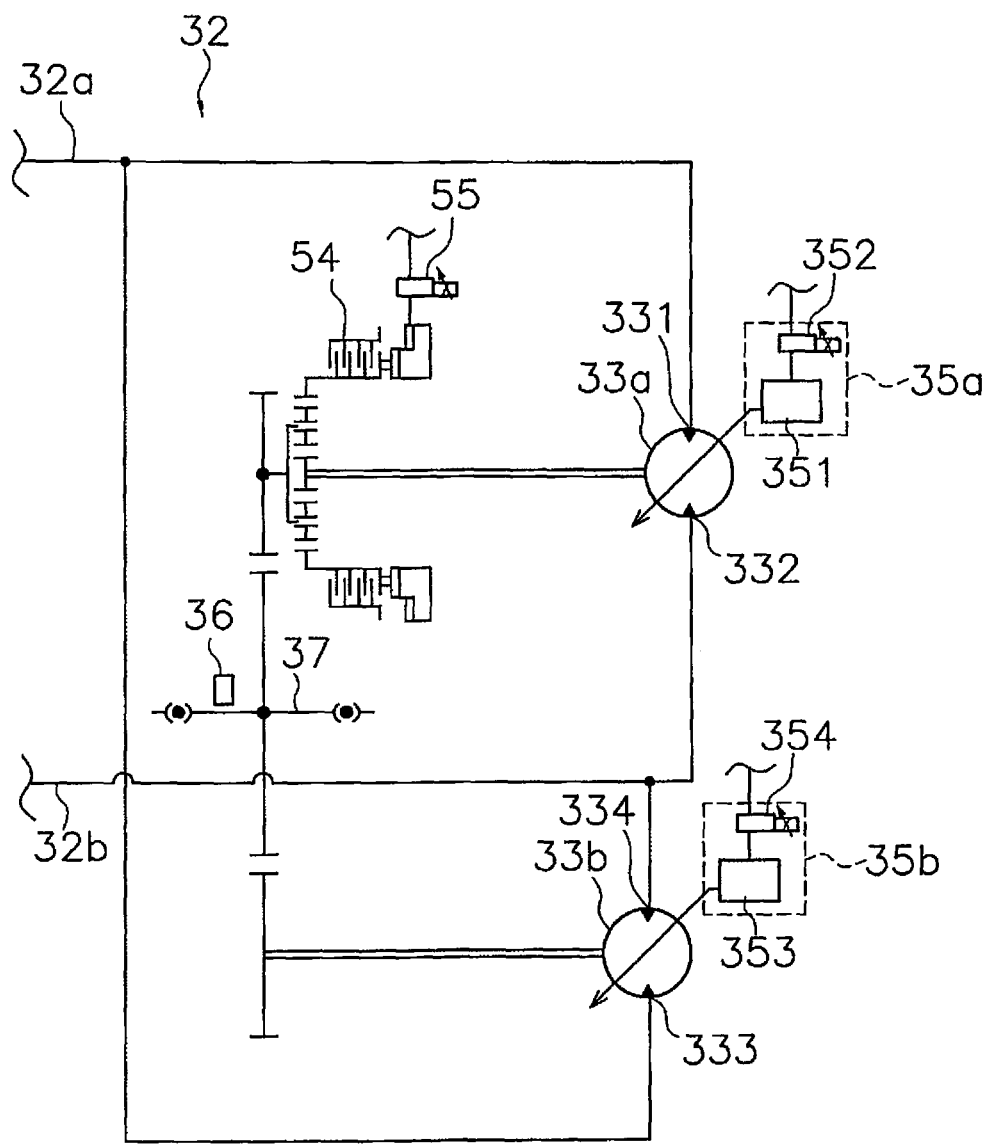
FIG. 3 is a block diagram illustrating a configuration of the drive system of the work vehicle.

FIGS. 2 and 3 are block diagrams of a configuration of a drive system of the work vehicle 1. As illustrated in FIG. 2, the work vehicle 1 includes an engine 21, a work implement pump 22, and a hydrostatic transmission (referred to below as "HST") 23. The engine 21 is, for example, a diesel engine. A fuel injection device 24 controls the fuel injection amount to the engine 21 whereby the output torque (referred to below as "engine torque") and the rotation speed of the engine 21 are controlled. The actual rotation speed of the engine 21 is detected by an engine rotation speed sensor 25. The engine speed sensor 25 outputs a signal indicating the actual rotation speed of the engine 21.

The work implement pump 22 is connected to the engine 21. The work implement pump 22 is driven by the engine 21 and discharges hydraulic fluid. Hydraulic fluid discharged from the work implement pump 22 is supplied through a work implement hydraulic circuit 26 to the lift cylinder 13. As a result, the work implement 3 is driven.

The work implement pump 22 is a variable displacement hydraulic pump. A work implement pump control device 28 is connected to the work implement pump 22. The work implement pump control device 28 controls the displacement of the work implement pump 22. The work implement pump 22 may also be a fixed displacement hydraulic pump.

A work implement control valve 30 is disposed in the work implement hydraulic circuit 26. The working implement control valve 30 controls the flow rate of the hydraulic fluid supplied to the lift cylinder 13 in response to a pilot pressure applied to the work implement control valve 30. Although omitted in the drawings, the work implement control valve 30 may also control the flow rate of the hydraulic fluid supplied to the bucket cylinder 14. The flow rate of hydraulic fluid signifies the amount of hydraulic fluid supplied per unit of time. The work implement control valve 30 is not limited to a hydraulic pressure pilot control valve and may be an electromagnetic proportional control valve controlled electrically. The operator controls the work implement control valve 30 by operating a work implement operating member which is not illustrated. Consequently, the operator is able to operate the work implement 3.

As illustrated in FIGS. 2 and 3, the HST 23 includes a travel pump 31, a drive hydraulic circuit 32, a first travel motor 33a and a second travel motor 33b. The travel pump 31 is connected to the engine 21. The travel pump 31 is driven by the engine 21 and discharges hydraulic fluid. The travel pump 31 is a variable displacement hydraulic pump. The hydraulic fluid discharged by the travel pump 31 is delivered to the travel motors 33a and 33b through the drive hydraulic circuit 32.

The drive hydraulic circuit 32 connects the travel pump 31 and the travel motors 33a and 33b. The drive hydraulic circuit 20 includes a first drive circuit 32a and a second drive circuit 32b. The first drive circuit 32a connects a first pump port 31a of the travel pump 31 and a first motor port 331 of the first travel motor 33a. The first drive circuit 32a also connects the first pump port 31a of the travel pump 31 and a first motor port 333 of the second travel motor 33b. The second drive circuit 32b connects a second pump port 31b of the travel pump 31 and a second motor port 332 of the first travel motor 33a. The second drive circuit 32b also connects the second pump port 31b of the travel pump 31 and a second motor port 334 of the second travel motor 33b. The travel pump 31, the travel motors 33a and 33b, the first drive circuit 32a and the second drive circuit 32b configure a closed circuit.

The hydraulic fluid is supplied from the travel pump 31 to the travel motors 33a and 33b through the first drive circuit 32a, whereby the travel motors 33a and 33b are driven in the forward traveling direction. In this case, the hydraulic fluid returns from the travel motors 33a and 33b to the travel pump 31 through the second drive circuit 32b. In addition, the hydraulic fluid is supplied from the travel pump 31 to the travel motors 33a and 33b through the second drive circuit 32b, whereby the travel motors 33a and 33b are driven in the reverse traveling direction. In this case, the hydraulic fluid returns from the travel motors 33a and 33b to the travel pump 31 through the first drive circuit 32a.

A drive circuit pressure sensor 34 is provided in the drive hydraulic circuit 32. The drive circuit pressure sensor 34 detects the pressure of the hydraulic fluid supplied through the first drive circuit 32a or the second drive circuit 32b to the first travel motor 33a. Specifically, the drive circuit pressure sensor 34 includes a first circuit pressure sensor 34a and a second circuit pressure sensor 34b.

The first circuit pressure sensor 34a detects the hydraulic pressure in the first drive circuit 32a. The second circuit pressure sensor 34b detects the hydraulic pressure in the second drive circuit 32b. The first circuit pressure sensor 34a outputs a signal indicating the hydraulic pressure in the first drive circuit 32a. The second circuit pressure sensor 34b outputs a signal indicating the hydraulic pressure in the second drive circuit 32b.

The travel motors 33a and 33b are variable displacement hydraulic motors. The travel motors 33a and 33b are driven by hydraulic fluid discharged from the travel pump 31 to produce driving power for traveling.

A first motor displacement control device 35a is connected to the first travel motor 33a. The first motor displacement control device 35a controls the displacement of the first travel motor 33a. The first motor displacement control device 35a includes a first motor cylinder 351 and a first motor control valve 352.

The first motor cylinder 351 is connected to the first travel motor 33a. The first motor cylinder 351 is driven by hydraulic pressure and changes the tilt angle of the first travel motor 33a. The first motor control valve 352 is an electromagnetic proportional control valve controlled based on an instruction signal inputted to the first motor control valve 352. The first motor control valve 352 actuates the first motor cylinder 351 whereby the displacement of the first travel motor 33a is changed.

A second motor displacement control device 35b is connected to the second travel motor 33b. The second motor displacement control device 35b controls the displacement of the second travel motor 33b. The second motor displacement control device 35b includes a second motor cylinder 353 and a second motor control valve 354. The configuration of the second motor displacement control device 35b is the same as that of the first motor displacement control device 35a and a detailed explanation is omitted.

The travel motors 33a and 33b are connected to a drive shaft 37. The drive shaft 37 is connected to the abovementioned traveling wheels 4 through axles which are not illustrated. The rotation of the travel motors 33a and 33b is transferred to the traveling wheels 4 via the drive shaft 37. As a result, the work vehicle 1 is able to travel.

The HST 23 includes a clutch 54 and a clutch control valve 55. The clutch 54 is disposed between the first travel motor 33a and the drive shaft 37. The clutch 54 is switched between an engaged state and a disengaged state. The clutch 54 connects the first travel motor 33a and the drive shaft 37 in the engaged state. As a result, the rotation of the first travel motor 33a and the rotation of the second travel motor 33b are both transmitted to the drive shaft 37. The clutch 54 disconnects the first travel motor 33a and the drive shaft 37 in the disengaged state. As a result, the rotation of the first travel motor 33a is not transmitted to the drive shaft 37 and only the rotation of the second travel motor 33b is transmitted to the drive shaft 37.

The clutch control valve 55 controls the pressure of the hydraulic fluid supplied to an oil chamber of the clutch 54. The clutch control valve 55 is, for example, an electromagnetic proportional control valve and controls the pressure of the hydraulic fluid supplied to the oil chamber of the clutch 54 in response to an inputted signal. The clutch control valve 55 may be a pressure proportional control valve controlled in response to an inputted pilot pressure. The pressure of the hydraulic fluid supplied to the oil chamber of the clutch 54 is controlled by the clutch control valve 55, whereby the clutch 54 is switched between the engaged state and the disengaged state.

The work vehicle 1 is provided with a vehicle speed sensor 36. The vehicle speed sensor 36 detects the vehicle speed. The vehicle speed sensor 36 outputs a signal indicating the vehicle speed. For example, the vehicle speed sensor 36 detects the vehicle speed by detecting the rotation speed of the drive shaft 37. In addition, the vehicle speed sensor 36 functions as a traveling direction sensor for detecting the actual traveling direction of the work vehicle 1. For example, the vehicle speed sensor 36 detects the traveling direction of the work vehicle 1 by detecting the rotating direction of the drive shaft 37. The vehicle speed sensor 36 may detect the rotation speed and the rotating direction of another shaft that rotates in response to the rotation of the drive shaft 37, or the rotation speed and the rotating direction of the gears, and is not limited to detecting the rotation speed and the rotating direction of the drive shaft 37.

The HST 23 includes a charge pump 38 and a charge circuit 39. The charge pump 38 is a fixed displacement hydraulic pump. The charge pump 38 is connected to the engine 21. The charge pump 38 is driven by the engine 21 to supply hydraulic fluid to the drive hydraulic circuit 32 through the charge circuit 39.

The charge circuit 39 is connected to the charge pump 38. The charge circuit 39 is connected to the first drive circuit 32a via a first check valve 41. The charge circuit 39 is connected to the second drive circuit 20b via a second check valve 42.

The charge circuit 39 is connected to the first drive circuit 32a via a first relief valve 43. The first relief valve 43 is opened when the hydraulic pressure in the first drive circuit 32a exceeds a predetermined relief pressure. The charge circuit 39 is connected to the second drive circuit 32b via a second relief valve 44. The second relief valve 44 is opened when the hydraulic pressure in the second drive circuit 32b exceeds a predetermined relief pressure.

A charge relief valve 40 is provided in the charge circuit 39. The charge relief valve 40 is opened when the hydraulic pressure in the charge circuit 39 exceeds a predetermined relief pressure. As a result, the hydraulic pressure in the charge circuit 39 is limited so as not to exceed the predetermined relief pressure.

A pump displacement control device 45 is connected to the travel pump 31. The pump displacement control device 45 controls the displacement of the travel pump 31. The displacement of the hydraulic pump signifies a discharge amount (cc/rev) of hydraulic fluid per one rotation. In addition, the pump displacement control device 45 controls the discharge direction of the travel pump 31. The pump displacement control device 45 includes a pump control cylinder 46 and a pump control valve 47.

The pump control cylinder 46 is connected to the travel pump 31. The pump control cylinder 46 is driven by hydraulic pressure and changes the tilt angle of the travel pump 31. As a result, the pump control cylinder 46 changes the displacement of the travel pump 31. The pump control cylinder 46 is connected to the charge circuit 39 via a pump pilot circuit 48.

The pump control valve 47 is an electromagnetic proportional control valve controlled based on an instruction signal inputted to the pump control valve 47. The pump control valve 47 switches the supply direction of hydraulic fluid to the pump control cylinder 46. The pump control valve 47 switches the discharge direction of the travel pump 31 by switching the supply direction of hydraulic fluid to the pump control cylinder 46. Consequently, the drive directions of the travel motors 33a and 33b are changed and the work vehicle 1 is switched between forward travel and reverse travel.

Specifically, the pump control valve 47 is switched between a forward travel state, a reverse travel state, and a neutral state. In the forward travel state, the pump control valve 47 connects the pump pilot circuit 48 to an oil chamber on the forward travel side of the pump control cylinder 46 and connects an oil chamber on the reverse travel side of the pump control cylinder 46 to a return circuit 49. Consequently, the pump control cylinder 46 is driven to the forward travel side and the discharge direction of the travel pump 31 is set to the forward traveling direction.

In the reverse travel state, the pump control valve 47 connects the pump pilot circuit 48 to the oil chamber on the reverse travel side of the pump control cylinder 46 and connects the oil chamber on the forward travel side of the pump control cylinder 46 to the return circuit 49. Consequently, the pump control cylinder 46 is driven to the reverse travel side and the discharge direction of the travel pump 31 is set to the reverse traveling direction. In the neutral state, the pump control valve 47 connects the pump pilot circuit 48, the oil chamber on the forward travel side, and the oil chamber on the reverse travel side of the pump control cylinder 46, to the return circuit 49 through a throttle.

In addition, the pump control valve 47 controls the pressure of hydraulic fluid supplied through the pump pilot circuit 48 to the pump control cylinder 46. Specifically, the pump control valve 47 changes the pressure of the hydraulic fluid supplied to the pump control cylinder 46, thereby adjusting the tilt angle of the travel pump 31. As a result, the displacement of the travel pump 31 is controlled.

The pump pilot circuit 48 is connected to a hydraulic fluid tank via a relief valve 52. A pilot port of the relief valve 52 is connected to the first drive circuit 32a and the second drive circuit 32b via a shuttle valve 53. The shuttle valve 53 introduces the largest hydraulic pressure (referred to below as "drive circuit pressure") between the hydraulic pressure of the first drive circuit 32a and the hydraulic pressure of the second drive circuit 32b to the pilot port of the relief valve 52.

The relief valve 52 enables the pump pilot circuit 48 to communicate with the hydraulic fluid tank when the drive circuit pressure is equal to or greater than a predetermined cutoff pressure. Consequently, the displacement of the travel pump 31 is reduced due to the hydraulic pressure of the pump pilot circuit 48 being reduced. As a result, an increase in the drive circuit pressure is suppressed.

Figure 4:
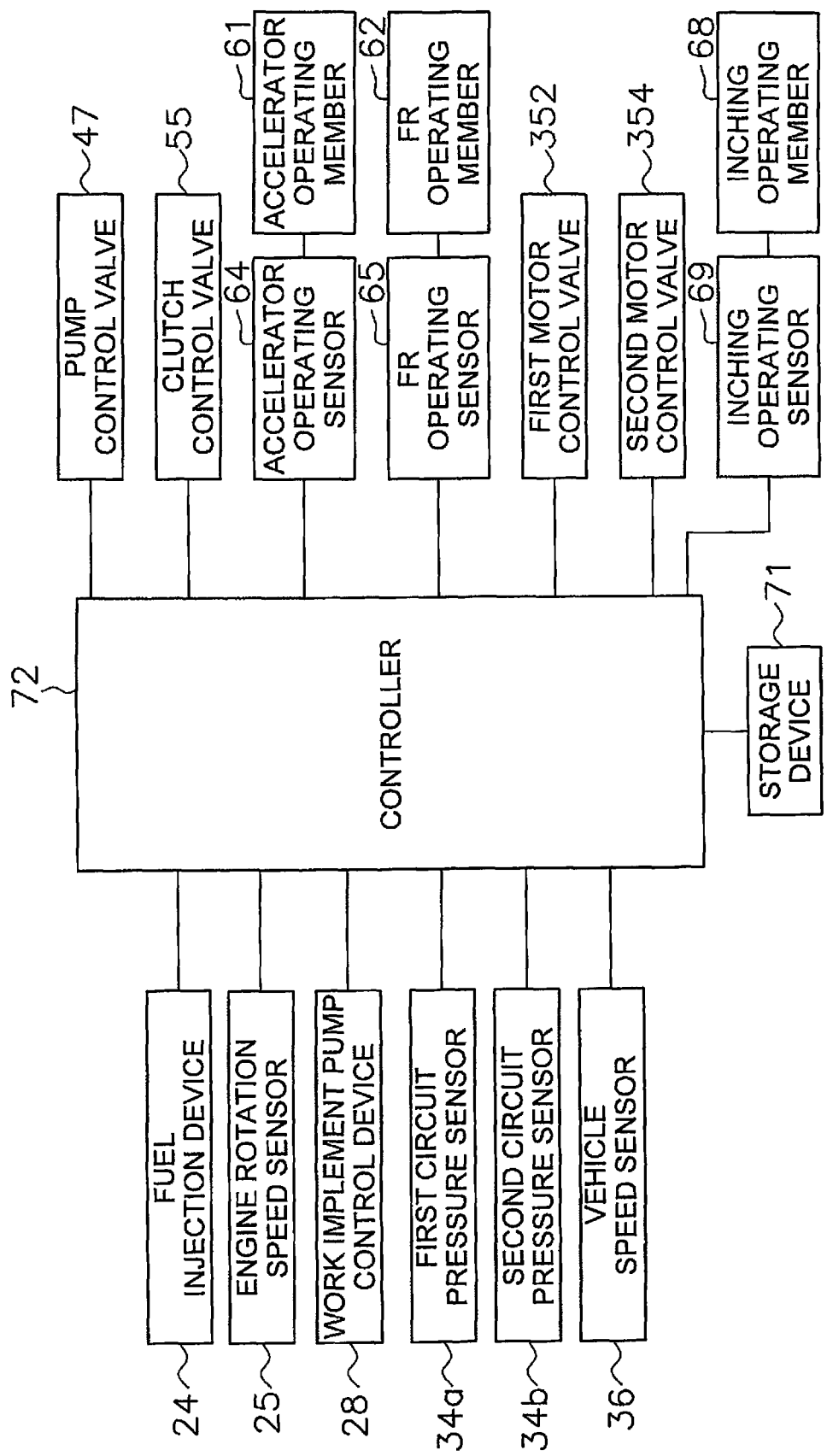
FIG. 4 is a block diagram illustrating a configuration of a control system of the work vehicle.

FIG. 4 is a schematic view of a control system of the work vehicle 1. As illustrated in FIG. 4, the work vehicle 1 includes an accelerator operating member 61, a FR operating member 62, and an inching operating member 68. The accelerator operating member 61, the FR operating member 62, and the inching operating member 68 are disposed so as to be operable by the operator. The accelerator operating member 61, the FR operating member 62, and the inching operating member 68 are disposed inside the cab 5.

The accelerator operating member 61 is, for example, an accelerator pedal. However, the accelerator operating member 61 may be another member such as a lever or a switch. The accelerator operating member 61 is connected to an accelerator operating sensor 64. The accelerator operating sensor 64 is, for example, a positional sensor that detects the position of the accelerator operating member 61. The accelerator operating sensor 64 outputs a signal indicating the operating amount (referred to below as "accelerator operating amount") of the accelerator operating member 61. The accelerator operating amount is expressed as a proportion in which the state of the accelerator operating member 61 being fully open is 100%. As explained below, the operator is able to control the vehicle speed and the tractive force by adjusting the accelerator operating amount.

The FR operating member 62 is, for example, an FR lever. However, the FR operating member 62 may be another member such as a switch. The FR operating member 62 is switched between the forward travel position, the reverse travel position, and the neutral position. The FR operating member 62 is connected to an FR operating sensor 65. The FR operating sensor 65 is, for example, a positional sensor that detects the position of the FR operating member 62. The FR operating sensor 65 outputs a signal indicating the position of the FR operating member 62. The operator can switch between forward travel and reverse travel of the work vehicle 1 by operating the FR operating member 62.

The inching operating member 68 is, for example, an inching pedal. However, the inching operating member 68 may be another member such as a lever or a switch. The inching operating member 68 is connected to an inching operating sensor 69. The inching operating sensor 69 is, for example, a positional sensor that detects the position of the inching operating member 68. The inching operating sensor 69 outputs a signal indicating the operating amount (referred to below as "inching operating amount") of the inching operating member 68. The inching operating amount is expressed, for example, by a proportion in which the state of the inching operating member 68 being fully open is 100%. The operator can control the vehicle speed and the tractive force by adjusting the inching operating amount.

As illustrated in FIG. 4, the work vehicle 1 includes a storage device 71 and a controller 72. The storage device 71 includes, for example, a memory and an auxiliary storage device. The storage device 71 may be a RAM or a ROM, for example. The storage device 71 may be a semiconductor memory or a hard disk or the like. The storage device 71 is an example of a non-transitory computer-readable recording medium. The storage device 71 stores computer instructions that are used for controlling the work vehicle 1 and that are executable by a processor.

The controller 72 includes, for example, a processor such as a CPU. The controller 72 is communicably connected to the above-mentioned sensors and the storage device 71. The controller 72 is communicably connected by wire or wirelessly to the above-mentioned sensors and the storage device 71. The controller 72 acquires various types of data by receiving signals from the sensors and the storage device 71. The controller 72 is programmed so as to control the work vehicle 1 based on the acquired data. The controller 72 may be configured by a plurality of controllers separate from each other.

The controller 72 is communicable connected by wire or wirelessly to the abovementioned control valves 352, 354, 47, 55, and to the fuel injection device 24. The controller 72 outputs instruction signals to the control valves 352, 354, 47, 55, and to the fuel injection device 24, thereby controlling the control valves 352, 354, 47, 55, and the fuel injection device 24.

Specifically, the controller 72 outputs an instruction signal to the fuel injection device 24 thereby controlling the engine torque and the rotation speed. The controller 72 outputs an instruction signal to the first motor control valve 352 thereby controlling the displacement of the first travel motor 33a. The controller 72 outputs an instruction signal to the second motor control valve 354 thereby controlling the displacement of the second travel motor 33b. The controller 72 outputs an instruction signal to the pump control valve 47 thereby controlling the displacement of the travel pump 31. The controller 72 outputs an instruction signal to the clutch control valve 55 thereby controlling the switching of the clutch 54.

Figure 5:
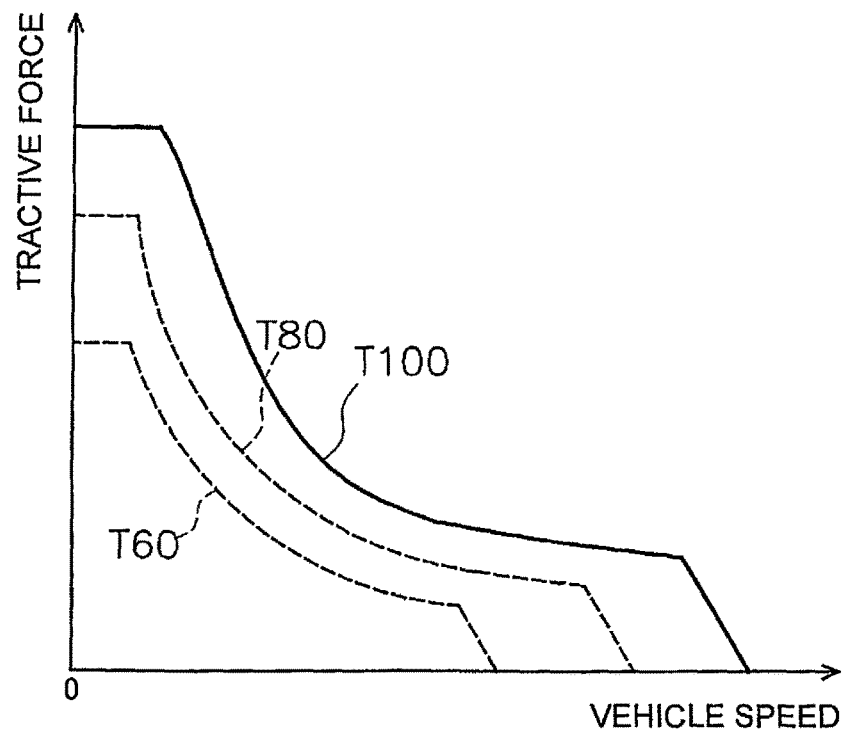
FIG. 5 illustrates vehicle speed-tractive force characteristics of the work vehicle.

The controller 72 controls the displacement of the travel pump 31 and the displacements of the travel motors 33a and 33b to control the transmission gear ratio of the HST 23 so that the vehicle speed-tractive force characteristics depicted in FIG. 5 are achieved. FIG. 5 illustrates an example of the vehicle speed-tractive force characteristics which are changed in response to the operation of the accelerator operating member 61 by the operator. In FIG. 5, T100 indicates the vehicle speed-tractive force characteristics when the accelerator operating amount is 100%. T80 indicates the vehicle speed-tractive force characteristics when the accelerator operating amount is 80%. T60 indicates the vehicle speed-tractive force characteristics when the accelerator operating amount is 60%.

The controller 72 controls the pump control valve 47 in response to the position of the FR operating member 62. Specifically, when the FR operating member 62 is in the forward travel position, the controller 72 sets the pump control valve 47 to the forward travel state. When the FR operating member 62 is in the reverse travel position, the controller 72 sets the pump control valve 47 to the reverse travel state. When the FR operating member 62 is in the neutral position, the controller 72 sets the pump control valve 47 to the neutral state. Consequently, the travel pump 31 is controlled in response to the operating position of the FR operating member 62.

The controller 72 switches the travel mode of the work vehicle 1 between one motor travel and two motor travel in response to the vehicle speed. Specifically the controller 72 sets the clutch control valve 55 to the engaged state when the vehicle speed is less than a predetermined switching threshold. As a result, the first travel motor 33a is connected to the drive shaft 37 and the rotation of the first travel motor 33a and the rotation of the second travel motor 33b are transmitted to the drive shaft 37. Therefore, the work vehicle 1 travels with the two motor travel when the vehicle speed is less than the predetermined switching threshold.

The controller 72 sets the clutch control valve 55 to the disengaged state when the vehicle speed is equal to or greater than the predetermined switching threshold. As a result, the first travel motor 33a is disconnected from the drive shaft 37, and the rotation of the first travel motor 33a is not transmitted to the drive shaft 37 and only the rotation of the second travel motor 33b is transmitted to the drive shaft 37. Therefore, the work vehicle 1 travels with the one motor travel when the vehicle speed is equal to or greater than the predetermined switching threshold.

Figure 6:
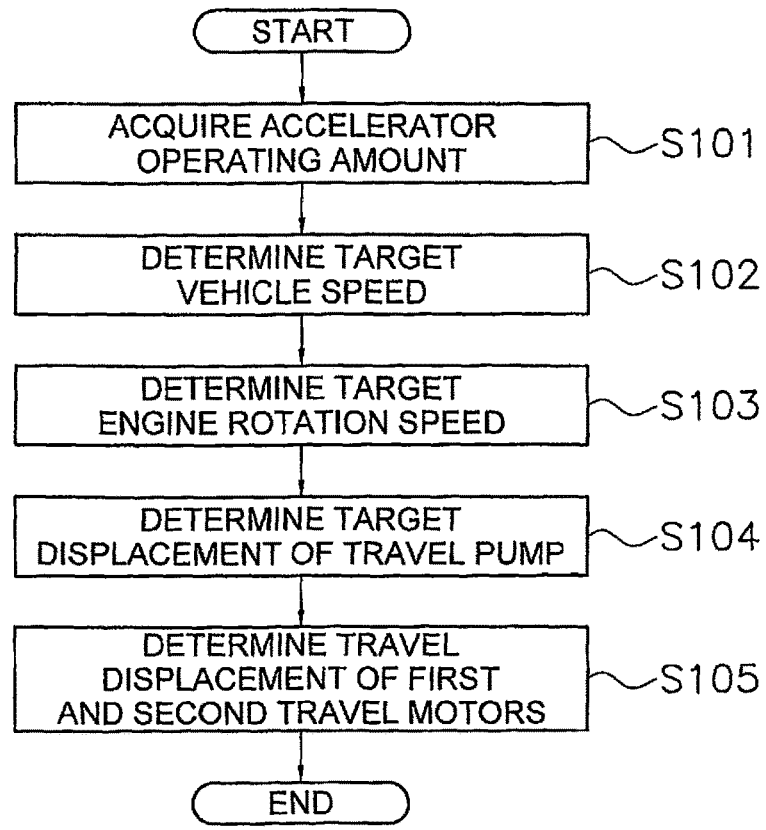
FIG. 6 is a flow chart of a processing executed by a controller.

Processing executed by the controller 72 will be explained below. FIG. 6 is a flow chart illustrating processing executed by the controller 72. The following explanation describes control when the work vehicle 1 is traveling forward, but the same control may be performed when the work vehicle 1 is traveling in reverse.

As illustrated in S101 in FIG. 6, the controller 72 acquires the accelerator operating amount. The controller 72 acquires the accelerator operating amount with a signal from the accelerator operating sensor 64.

Figure 7:
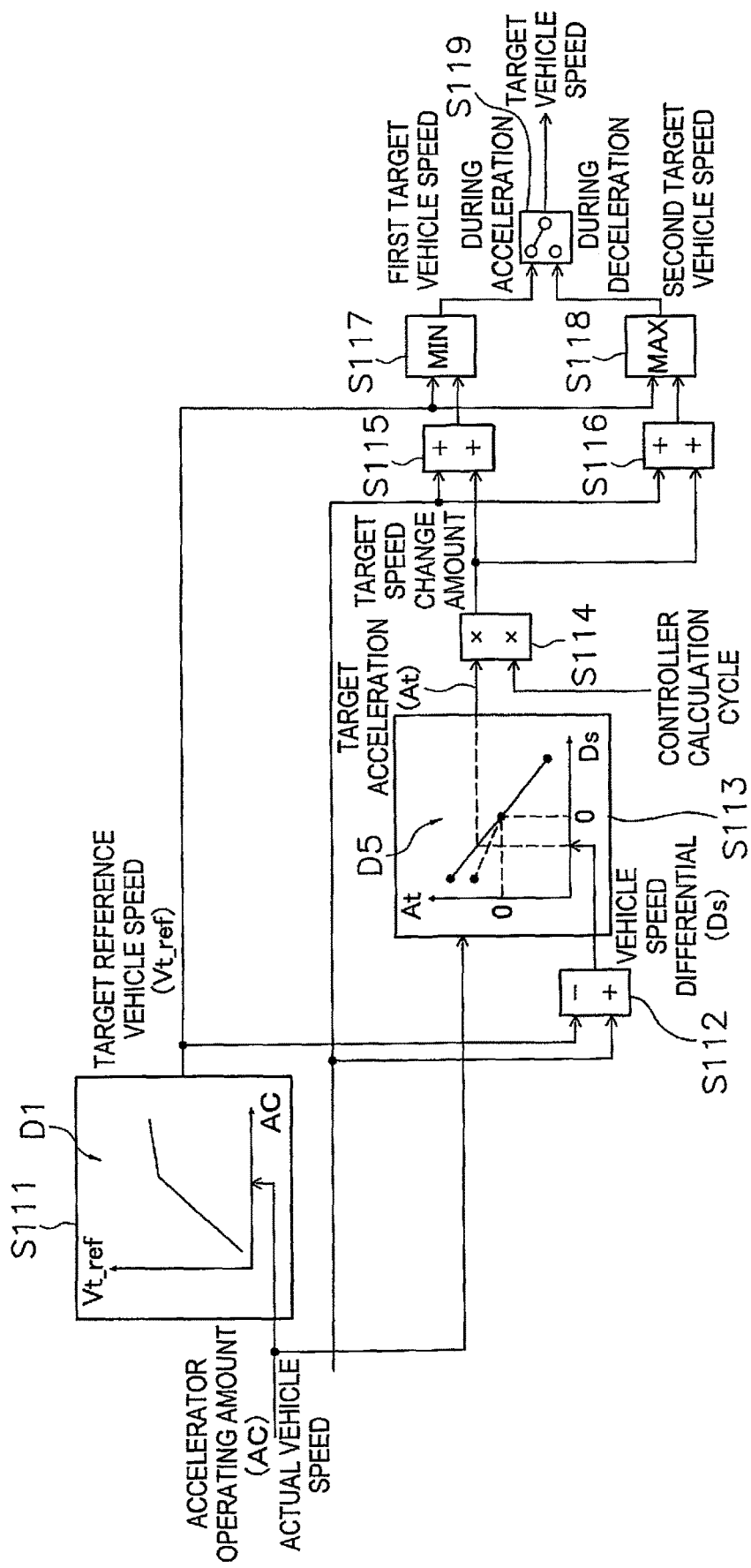
FIG. 7 illustrates processing for determining a target vehicle speed.

In step S102, the controller 72 determines the target vehicle speed. The controller 72 determines the target vehicle speed based on the accelerator operating amount. FIG. 7 illustrates processing for determining the target vehicle speed based on the accelerator operating amount.

As illustrated in step S111 in FIG. 7, the controller 72 determines a target reference vehicle speed from the accelerator operating amount. The target reference vehicle speed is the vehicle speed set as a target attainment vehicle speed when the work vehicle 1 is traveling on level ground. The storage device 71 stores reference vehicle speed data D1 which defines the relationship between the accelerator operating amount and the target reference vehicle speed. In the reference vehicle speed data D1, the target reference vehicle speed increases in response to an increase in the accelerator operating amount. The controller 72 refers to the reference vehicle speed data D1 and determines the target reference vehicle speed corresponding to the accelerator operating amount.

In step S112, the controller 72 calculates a vehicle speed differential. The vehicle speed differential is the difference between the target reference vehicle speed and the actual vehicle speed. In step S113, the controller 72 calculates a target acceleration. The controller 72 calculates the target acceleration from the vehicle speed differential and the accelerator operating amount. Specifically, the controller 72 refers to acceleration data D5 and calculates the target acceleration corresponding to the vehicle speed differential. The acceleration data D5 defines the relationship between the vehicle speed differential and the target acceleration. In the acceleration data D5, the target acceleration decreases in response to an increase of the vehicle speed differential. The controller 72 changes the acceleration data D5 in response to the accelerator operating amount. The controller 72 changes the acceleration data D5 so that the target acceleration increases in correspondence to an increase in the accelerator operating amount even if the vehicle speed differential is the same. The vehicle speed differential being negative signifies that the work vehicle 1 is accelerating. The vehicle speed differential being positive signifies that the work vehicle 1 is decelerating. The target acceleration being a positive value signifies acceleration and the target acceleration being a negative value signifies deceleration.

In step S114, the controller 72 calculates a target speed change amount from the target acceleration. The controller 72 calculates the target speed change amount by multiplying the target acceleration by a calculation cycle of the controller 72.

In step S115 and step S116, the controller 72 adds the target speed change amount to the actual vehicle speed. In step S117, the controller 72 selects the smaller (first target vehicle speed) of the value derived by adding the target speed change amount to the actual vehicle speed, and the target reference vehicle speed. In step S118, the controller 72 selects the larger (second target vehicle speed) of the value derived by adding the target speed change amount to the actual vehicle speed, and the target reference vehicle speed.

In step S119, the controller 72 determines the target vehicle speed in response to whether the work vehicle 1 is accelerating or decelerating. The controller 72 determines that the work vehicle 1 is accelerating when the actual vehicle speed is smaller than the target reference vehicle speed. The controller 72 also determines that the work vehicle 1 is decelerating when the actual vehicle speed is greater than the target reference vehicle speed. The controller 72 determines the first target vehicle speed during acceleration as the target vehicle speed, and determines the second target vehicle speed during deceleration as the target vehicle speed. When the target vehicle speed is a negative value, the controller 72 sets the target vehicle speed to zero.

Figure 8:
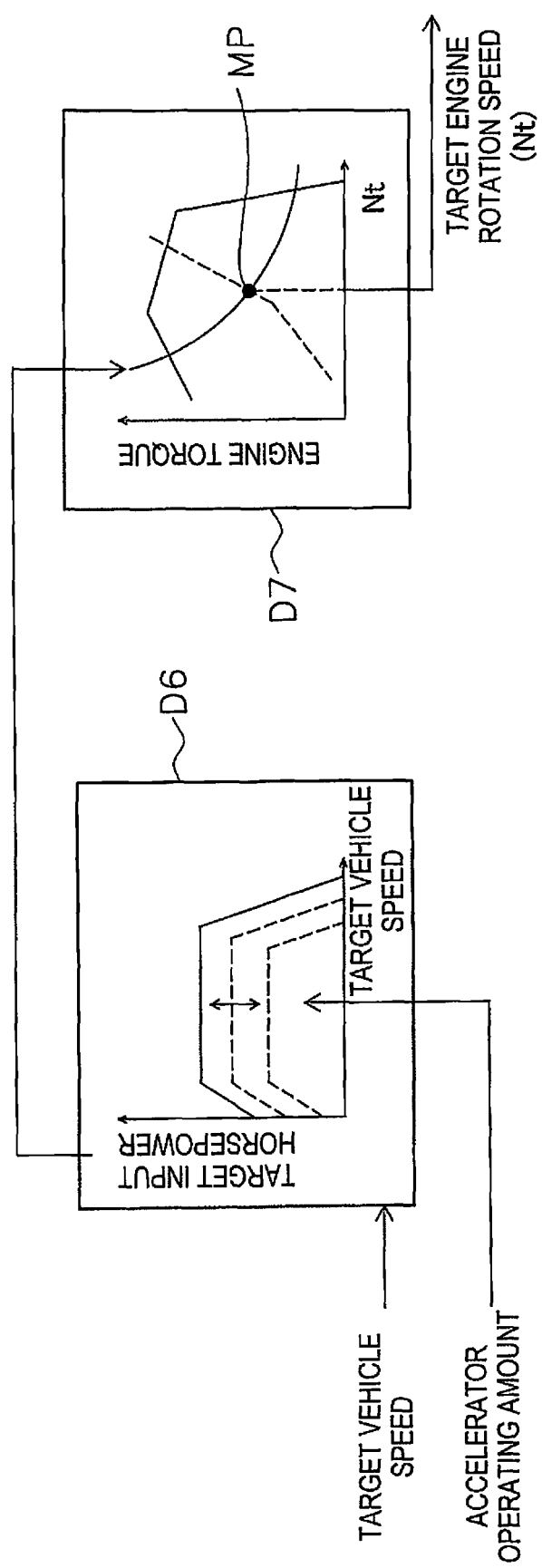
FIG. 8 illustrates processing for determining a target engine rotation speed.

In step S103, the controller 72 determines a target engine rotation speed. The controller 72 determines the target engine rotation speed in response to the accelerator operating amount and the target vehicle speed. Specifically as illustrated in FIG. 8, the controller 72 determines a target input horsepower in response to the accelerator operating amount and the target vehicle speed. The storage device 71 stores target input horsepower data D6 which indicates the relationship between the target vehicle speed, the accelerator operating amount, and the target input horsepower. The controller 72 refers to the target input horsepower data D6 and determines the target input horsepower from the accelerator operating amount and the target vehicle speed so that target vehicle speed-target input horsepower characteristics corresponding to the accelerator operating amount are achieved.

The controller 72 determines the target engine rotation speed from the target input horsepower. The storage device 71 stores engine torque-rotation speed data D7 which defines the relationship between the engine torque and the target engine rotation speed. The controller 72 refers to the engine torque-rotation speed data D7 and determines the target engine rotation speed corresponding to the target input horsepower. The controller 72 determines the target engine rotation speed so that the engine torque and the absorption torque of the travel pump 31 match at a predetermined matching point MP on an equivalent horsepower line corresponding to the target input horsepower. The controller 72 controls the fuel injection device 24 in response to the accelerator operating amount and the load with an all-speed governor method. Specifically, the controller 72 outputs an instruction signal to the fuel injection device 24 so that an engine rotation speed corresponding to the load is achieved on a regulation line corresponding to the accelerator operating amount.

Figure 9A:
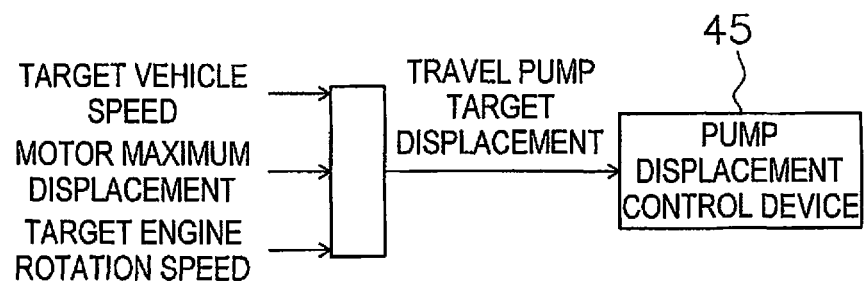
FIG. 9A and FIG. 9B illustrate processing for determining a target displacement of a travel pump and a target displacement of a travel motor.

Next, in step S104, the controller 72 determines the target displacement of the travel pump 31. As illustrated in FIG. 9A, the controller 72 determines the target displacement of the travel pump 31 from the target vehicle speed, the maximum displacements of the travel motors 33a and 33b, and the target engine rotation speed. Specifically, the controller 72 calculates the flow rates of the travel motors 33a and 33b for achieving the target vehicle speed from the target vehicle speed and the maximum displacement of the travel motors 33a and 33b, and calculates the target displacement of the travel pump 31 from the flow rate of the travel motors 33a and 33b and the target engine rotation speed. The controller 72 outputs an instruction signal which indicates the target displacement of the travel pump 31 to the pump displacement control device 45.

As described above, the work vehicle 1 is switched between two motor travel and one motor travel in response to the vehicle speed. The abovementioned maximum displacement of the travel motors 33a and 33b is the total of the maximum displacement of the first travel motor 33a and the maximum displacement of the second travel motor 33b during the two motor travel. The maximum displacement of the travel motors 33a and 33b is the maximum displacement of the first travel motor 33a during one motor travel.

Figure 9B:
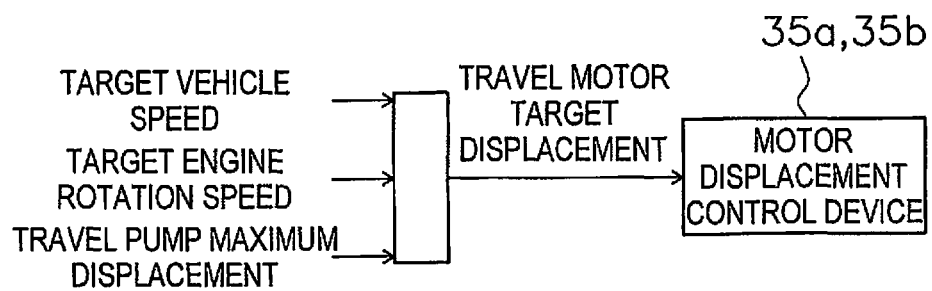

In step S105, the controller. 72 determines the target displacement of the travel motors 33a and 33b. As illustrated in FIG. 9B, the controller 72 determines the target displacement of the travel motors 33a and 33b from the target vehicle speed, the target engine rotation speed, and the maximum displacement of the travel pump 31. Specifically, the controller 72 determines the flow rate of the travel pump 31 from the target engine rotation speed and the maximum displacement of the travel pump 31. The controller 72 calculates the rotation speed of the travel motors 33a and 33b for achieving the target vehicle speed from the target vehicle speed. The controller 72 calculates the target displacement of the travel motors 33a and 33b from the flow rate of the travel pump 31 and the rotation speeds of the travel motors 33a and 33b. The controller 72 outputs signals indicating the target displacement of the travel motors 33a and 33b to the first motor displacement control device 35a and the second motor displacement control device 35b.

Figure 10:
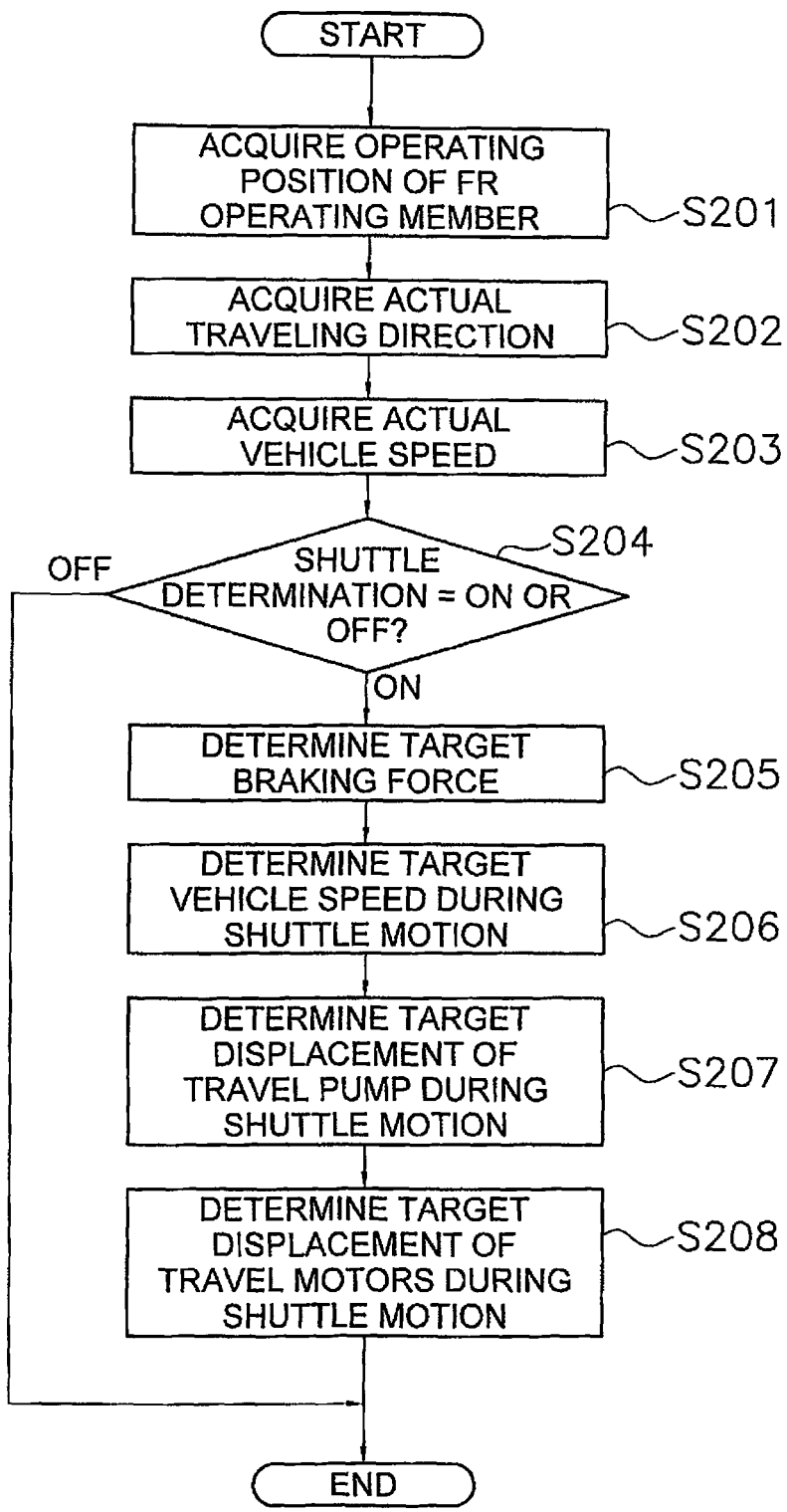
FIG. 10 is a flow chart illustrating processing executed by the controller during a shuttle motion.

Next, control during the shuttle motion executed by the controller 72 will be explained. The controller 72 determines a target braking force in response to the accelerator operating amount during the shuttle motion of the work vehicle 1, and determines the target displacement of the travel pump and the target displacement of the travel motors based on the target braking force. FIG. 10 is a flow chart of processing executed by the controller 72 during the shuttle motion. The controller 72 repeatedly executes the processing illustrated in FIG. 10 at a predetermined computation cycle.

As illustrated in step S201 in FIG. 10, the controller 72 acquires the operating position of the FR operating member 62. The controller 72 acquires the operating position of the FR operating member 62 with a signal from the FR operating sensor 65.

In step S202, the controller 72 acquires the actual traveling direction of the work vehicle 1. The controller 72 acquires the actual traveling direction of the work vehicle 1 with a signal from the vehicle speed sensor 36.

In step S203, the controller 72 acquires the actual vehicle speed of the work vehicle 1. The controller 72 acquires the actual vehicle speed of the work vehicle 1 with a signal from the vehicle speed sensor 36.

In step S204, the controller 72 determines whether a shuttle determination is "ON" or "OFF." The shuttle determination being "ON" signifies that the work vehicle 1 is in the shuttle motion. The shuttle determination being "OFF" signifies that the work vehicle 1 has completed the shuttle motion.

The controller 72 determines that the shuttle determination is "ON" when a non-match is generated between the actual traveling direction of the work vehicle 1 and the operating position of the FR operating member 62 and when the FR operating member 62 is being operated, and maintains the previous shuttle determination when otherwise. The controller 72 determines that a non-match is generated when the actual traveling direction of the work vehicle 1 and the operating position of the FR operating member 62 match during the previous determination and the actual traveling direction of the work vehicle 1 and the operating position of the FR operating member 62 do not match during the current determination. In addition, the controller 72 determines that the FR operating member 62 is being operated when the current value of the signal from the FR operating sensor 65 differs from the previous value. The controller 72 determines that there is a match when the work vehicle 1 is in a stopped state or a mostly stopped state. In addition, the controller 72 determines that there is a non-match when the work vehicle 1 is not in the stopped state or the mostly stopped state and when the operating position of the FR operating member 62 is in the neutral position.

The controller 72 determines that the shuttle determination is "OFF" when the actual traveling direction of the work vehicle 1 and the operating position of the FR operating member 62 match, or when the target vehicle speed during the shuttle motion is greater than a predetermined completion threshold as described below. The completion threshold may be zero or may be a value small enough to regard the work vehicle 1 as being mostly stopped. The target vehicle speed is positive in the direction corresponding to the operating position of the operating member.

Figure 11:
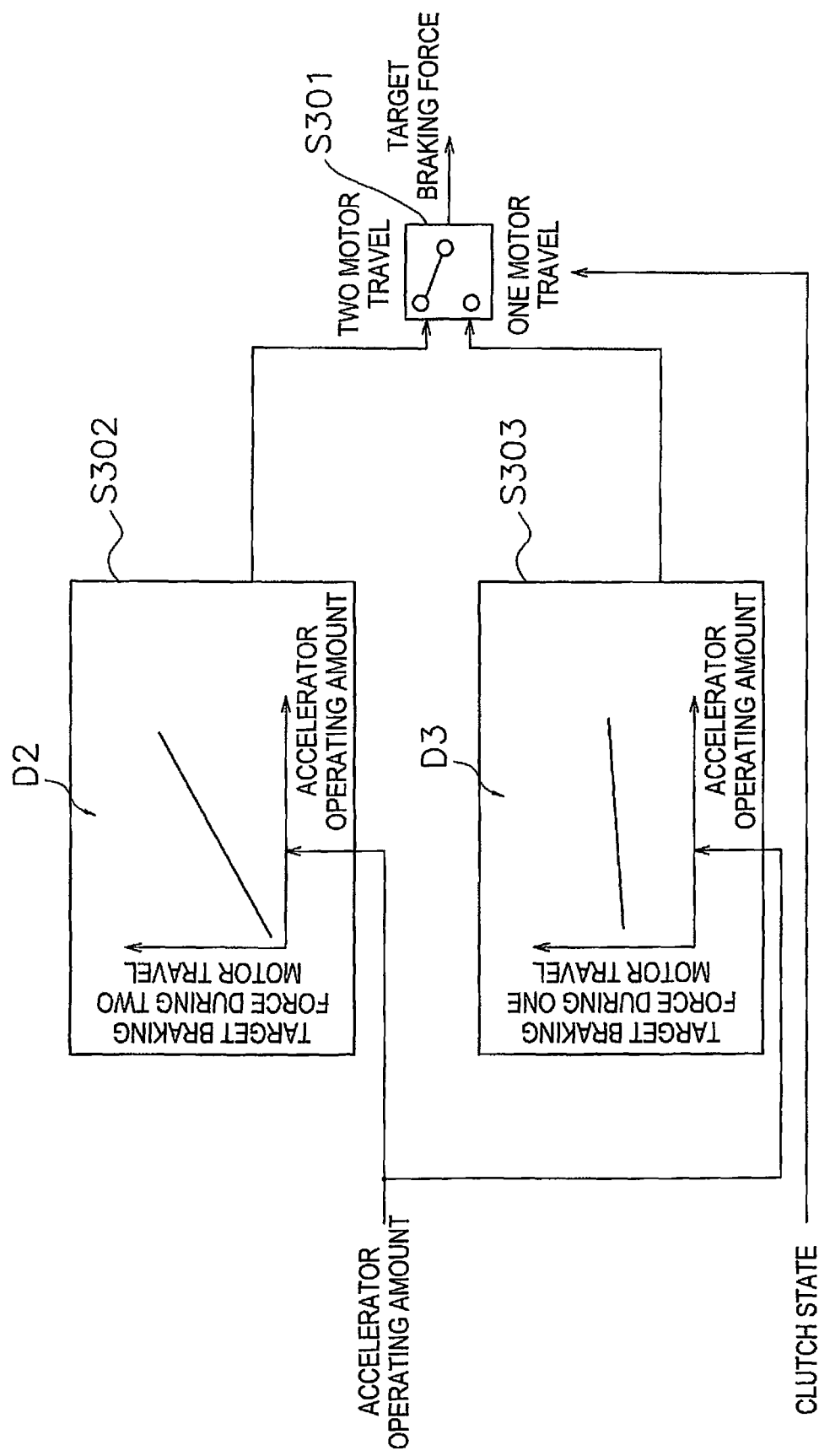
FIG. 11 illustrates processing for determining a target braking force during the shuttle motion.

When the shuttle determination is "ON" in step S204, the processing advances to step S205. In step S205, the controller 72 determines the target braking force. Here, the controller 72 determines the target braking force in response to the accelerator operating amount. FIG. 11 illustrates processing for determining the target braking force.

As illustrated in FIG. 11, the controller 72 refers to target braking data D2 and D3 and determines the target braking force from the accelerator operating amount. The target braking data D2 and D3 define relationships between the accelerator operating amount and the target braking force and are stored in the storage device 71. Specifically, the target braking data D2 and D3 include target braking data D2 during two motor travel and the target braking data D3 during one motor travel. The target braking data D2 and D3 both define target braking forces that increase in response to an increase in the accelerator operating amount.

In step S301, the controller 72 determines whether the travel mode of the work vehicle 1 is the one motor travel or the two motor travel from the state of the clutch 54. Specifically, the controller 72 determines that the travel mode is the two motor travel when the clutch 54 is in the engaged state. The controller 72 determines that the travel mode is the one motor travel when the clutch 54 is in the disengaged state.

When the travel mode is the two motor travel, in step S302 the controller 72 refers to the target braking data D2 during the two motor travel and determines the target braking force from the accelerator operating amount. When the travel mode is the one motor travel, in step S303 the controller 72 refers to the target braking data D3 during the one motor travel and determines the target braking force from the accelerator operating amount. When the operating position of the operating member is in the neutral position, the controller 72 sets the target braking force to a predetermined fixed value.

Figure 12:
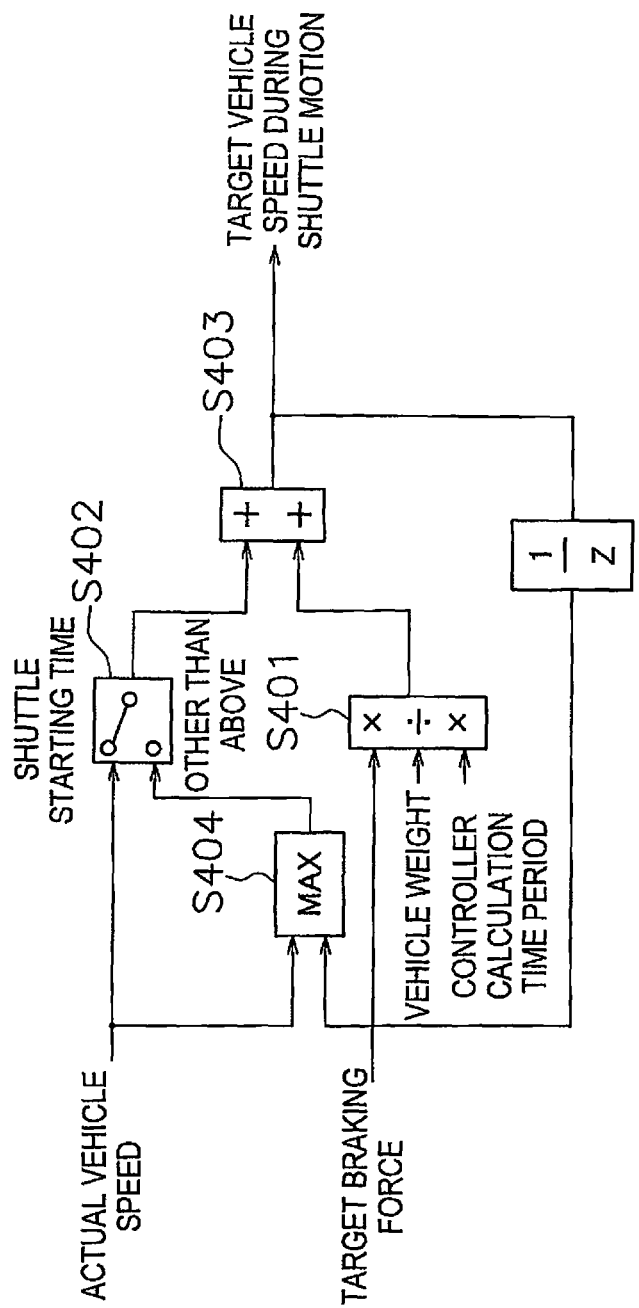
FIG. 12 illustrates processing for determining a target vehicle speed during the shuttle motion.

Next in step S206 in FIG. 10, the controller 72 determines a target vehicle speed during the shuttle motion. The controller 72 determines the target vehicle speed during the shuttle motion from an elapsed time since the starting time of the shuttle motion, the actual vehicle speed, and the target braking force. FIG. 12 illustrates processing for determining the target vehicle speed during the shuttle motion.

As illustrated in FIG. 12, in step S401 the controller 72 calculates a deceleration amount of the target vehicle speed due to the target braking force. The controller 72 calculates the deceleration amount of the target vehicle speed due to the target braking force by dividing the target braking force by the vehicle weight of the work vehicle 1 and multiplying the result by the calculation time period of the controller 72. The calculation time period of the controller 72 signifies the computation cycles repeated during the abovementioned processing.

In step S402, the controller 72 determines whether the current computation time point is the starting time of the shuttle motion. The controller 72 determines whether the current computation time point is the starting time of the shuttle motion according to the abovementioned determination result of step S204. The controller 72 determines that the current computation time point is the starting time of the shuttle motion when the shuttle determination at the previous computation time point is "OFF" and the shuttle determination at the current computation time point is "ON."

When the current computation time point is the starting time of the shuttle motion in step S402, the controller 72 determines the target vehicle speed during the shuttle motion by adding the deceleration amount of the target vehicle speed calculated in step S401 to the actual vehicle speed in step S403. Therefore, the controller 72 increases the target vehicle speed during the shuttle motion in response to the elapsed time since the starting time of the shuttle motion.

The actual vehicle speed is positive in the direction corresponding to the operating position of the FR operating member. The actual traveling direction of the work vehicle 1 during the shuttle motion is the opposite of the direction corresponding to the operating position of the FR operating member, and therefore the actual vehicle speed is a negative value.

When the current computation time point is not the starting time of the shuttle motion in step S402, the controller 72 calculates the larger of the actual vehicle speed and the target vehicle speed during the previous shuttle motion in step S404, and determines the target vehicle speed during the shuttle motion by adding the deceleration amount of the target vehicle speed calculated in step S401 to the larger of the actual vehicle speed and the target vehicle speed during the previous shuttle motion.

Figure 13:
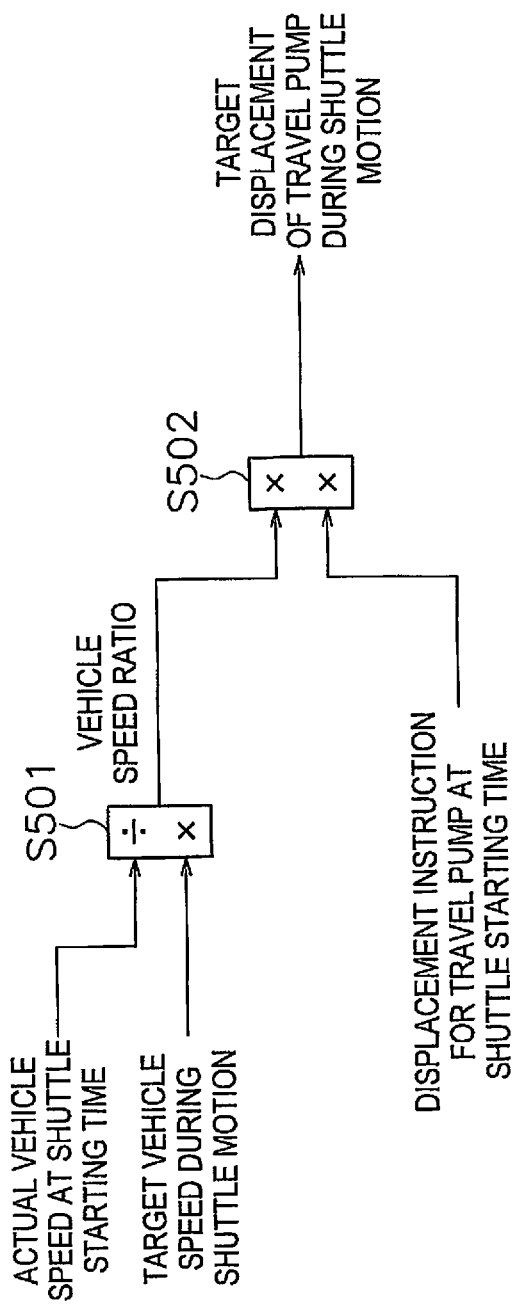
FIG. 13 illustrates processing for determining the target displacement of the travel pump during the shuttle motion.

Next, in step S207 in FIG. 10, the controller 72 determines the target displacement of the travel pump 31 during the shuttle motion. The controller 72 determines the target displacement of the travel pump 31 during the shuttle motion from the target vehicle speed during the shuttle motion. FIG. 13 illustrates processing for determining the target displacement of the travel pump 31 during the shuttle motion.

As illustrated in step S501 in FIG. 13, the controller 72 calculates a vehicle speed ratio by dividing the target vehicle speed during the shuttle motion determined in step S403 by the actual vehicle speed at the starting time of the shuttle motion. The controller 72 stores the actual vehicle speed detected at the starting time of the shuttle motion in the storage device 71 as the actual vehicle speed at the starting time of the shuttle motion.

In step S502, the controller 72 determines the target displacement of the travel pump 31 during the shuttle motion by multiplying a displacement instruction for the travel pump 31 at the starting time of the shuttle motion by the vehicle speed ratio calculated in step S501. The controller 72 stores the target displacement of the travel pump 31 determined at the starting time of the shuttle motion in the storage device 71 as the displacement instruction for the travel pump 31 at the starting time of the shuttle motion.

As described above, the absolute value of the target vehicle speed during the shuttle motion decreases in response to the elapsed time from the starting time of the shuttle motion. Therefore, the vehicle speed ratio decreases in response to the elapsed time from the starting time of the shuttle motion. Therefore, the controller 72 determines the target displacement of the travel pump 31 by reducing the displacement instruction of the travel pump 31 at the starting time of the shuttle motion in accordance with the elapsed time from the starting time of the shuttle motion and the target braking force.

Figure 14:
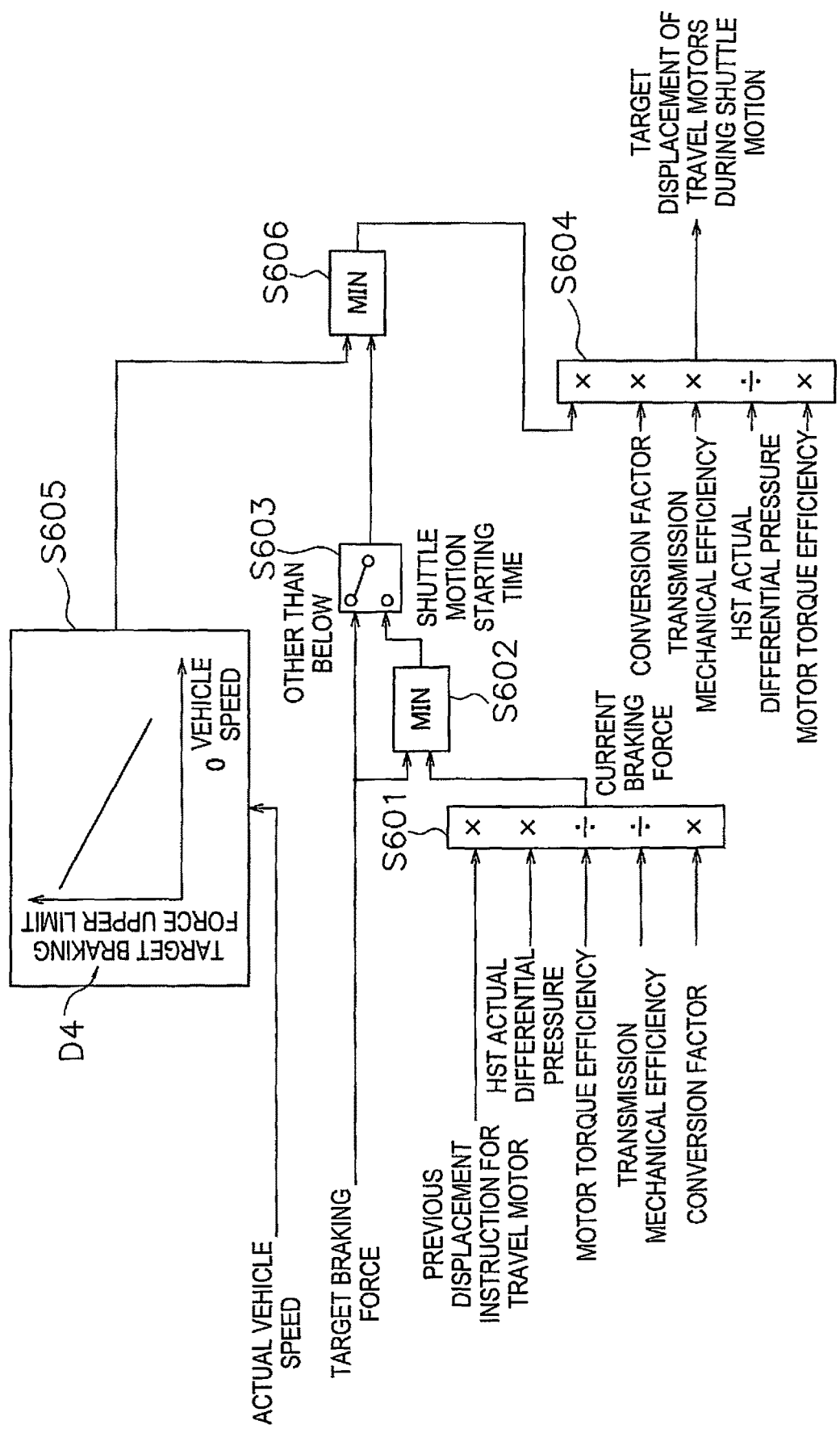
FIG. 14 illustrates processing for determining the target displacement of the travel motors during the shuttle motion.

Next, in step S208 in FIG. 10, the controller 72 determines the target displacement of the travel motors 33*a* and 33*b* during the shuttle motion. FIG. 14 illustrates processing for determining the target displacement of the travel motors 33*a* and 33*b* during the shuttle motion.

In step S601, the controller 72 calculates the current braking force from the previous displacement instructions for the travel motors 33*a* and 33*b* and an HST actual differential pressure. The HST actual differential pressure is the actual differential pressure between the first drive circuit 32*a* and the second drive circuit 32*b*. The controller 72 acquires the HST actual differential pressure from a signal from the first circuit pressure sensor 34*a* and a signal from the second circuit pressure sensor 34*b*.

Specifically, the controller 72 divides the product of the previous displacement instructions of the travel motors 33*a* and 33*b* and the HST actual differential pressure, by a motor torque efficiency and a transmission mechanical efficiency, and multiplies the result by a predetermined conversion factor, thereby calculating the current braking force. The transmission mechanical efficiency is the transmission efficiency from the output shaft of the HST 23 to the traveling wheels 4. The predetermined conversion factor is a factor for converting the torque of the output shaft of the HST 23 to the tractive force of the work vehicle 1.

In step S602, the controller 72 selects the smaller of a target braking amount and the current braking force. In step S603, the controller 72 determines whether the current computation time point is the starting time of the shuttle motion. When the current computation time point is not the starting time of the shuttle motion in step S603, the controller 72 calculates the target displacement of the travel motors 33*a* and 33*b* during the shuttle motion from the target braking force and the HST actual differential pressure in step S604. Specifically, the controller 72 multiplies the target braking force by a predetermined conversion factor and the transmission mechanical efficiency, divides the result by the HST actual differential pressure, and multiplies the result by the motor torque efficiency, thereby calculating the target displacement of the travel motors 33*a* and 33*b* during the shuttle motion. The predetermined conversion factor is a factor for converting the tractive force of the work vehicle 1 to the torque of the output shaft of the HST 23.

In step S605, the controller 72 refers to braking upper limit data D4 and determines the upper limit of the target braking force from the actual vehicle speed. The braking upper limit data D4 defines the relationship between the actual vehicle speed and the upper limit of the target braking force. In step S606, the controller 72 selects the smaller of the target braking force and the upper limit and calculates the target displacement of the travel motors 33*a* and 33*b* during the shuttle motion from the smaller of the target braking force and the upper limit in step S604.

The braking upper limit data D4 defines the upper limit of the target braking force that is reduced in response to a decrease in the absolute value of the actual vehicle speed. Therefore, the controller 72 reduces the target braking force in response to a decrease in the absolute value of the actual vehicle speed.

When the current computation time point is the starting time of the shuttle motion in step S603, the controller 72 calculates the target displacement of the travel motors 33*a* and 33*b* during the shuttle motion from the smaller of the target braking force and the current braking force. That is, when the current braking force is smaller than the target braking force at the starting time of the shuttle motion, the controller 72 calculates the target displacement of the travel motors 33*a* and 33*b* during the shuttle motion from the current braking force instead of from the abovementioned target braking force. Consequently, a sudden change in the braking force at the starting time of the shuttle motion is suppressed and the generation of shock can be suppressed. Filter processing for preventing a sudden change in the target braking force may also be provided between steps S603 to S606. Consequently, a sudden change in the target braking force after the starting time of the shuttle motion is suppressed and the generation of shock can be suppressed.

In the work vehicle according to the present embodiment as explained above, when the work vehicle 1 is in the shuttle motion, the target displacement of the travel pump 31 and the target displacement of the travel motors 33*a* and 33*b* are determined based on the target braking force determined by the controller 72. As a result, shock during the shuttle motion can be suppressed by setting a desired target braking force and not by a throttle. As a result, the responsiveness for controlling the travel pump 31 and the travel motors 33*a* and 33*b* during the shuttle motion can be improved in comparison to when shock is suppressed by a throttle. Consequently, motions of the work vehicle 1 that conform to the intent of the operator can be achieved with accuracy while suppressing the generation of shock during the shuttle motion.

Although an embodiment of the present invention has been described so far, the present invention is not limited to the above embodiment and various modifications may be made within the scope of the invention.

The work vehicle 1 may be another type of vehicle such as a motor grader and is not limited to a wheel loader. The configurations of the drive system and the control system of the work vehicle 1 are not limited to the above embodiment and may be changed. For example, the number of travel motors s is not limited to two and may be one or three or more. The displacement of the travel pump 31 may be controlled by another control valve and the control is not limited to the pump control valve 47. That is, a control valve for controlling the pressure of the hydraulic fluid supplied to the pump control cylinder 46 through the pump pilot circuit 48 may be provided separately from the pump control valve 47.

The parameters used in the above computations are not limited to the abovementioned parameters and may be changed. Alternatively, a parameter other than the abovementioned parameters may be used in the computations. The abovementioned types of data may be expressed, for example, by formulas or may be formats such as tables, maps or the like.

The controller 72 may determine the target vehicle speed with a method different from the method described in the embodiment. The controller 72 may determine the target engine rotation speed with a method different from the method described in the embodiment. The controller 72 may determine the target displacement of the travel pump 31 with a method different from the method described in the embodiment. The controller 72 may determine the target displacement of the travel motors 33*a* and 33*b* with a method different from the method described in the embodiment.

In the above embodiment, the controller 72 determines the target displacement of the travel pump 31 and the target displacement of the travel motors 33*a* and 33*b* based on the target braking force when the work vehicle 1 is in the shuttle motion. However, the controller 72 may determine only one of the target displacement of the travel pump 31 and the target displacement of the travel motors 33*a* and 33*b* based on the target braking force when the work vehicle 1 is in the shuttle motion.

The traveling direction sensor is not limited to the vehicle speed sensor and may be another sensor. For example, the traveling direction of the work vehicle 1 may be detected by a GPS or other GNSS sensor that outputs a signal indicating the position of the work vehicle 1.

Figure 15:
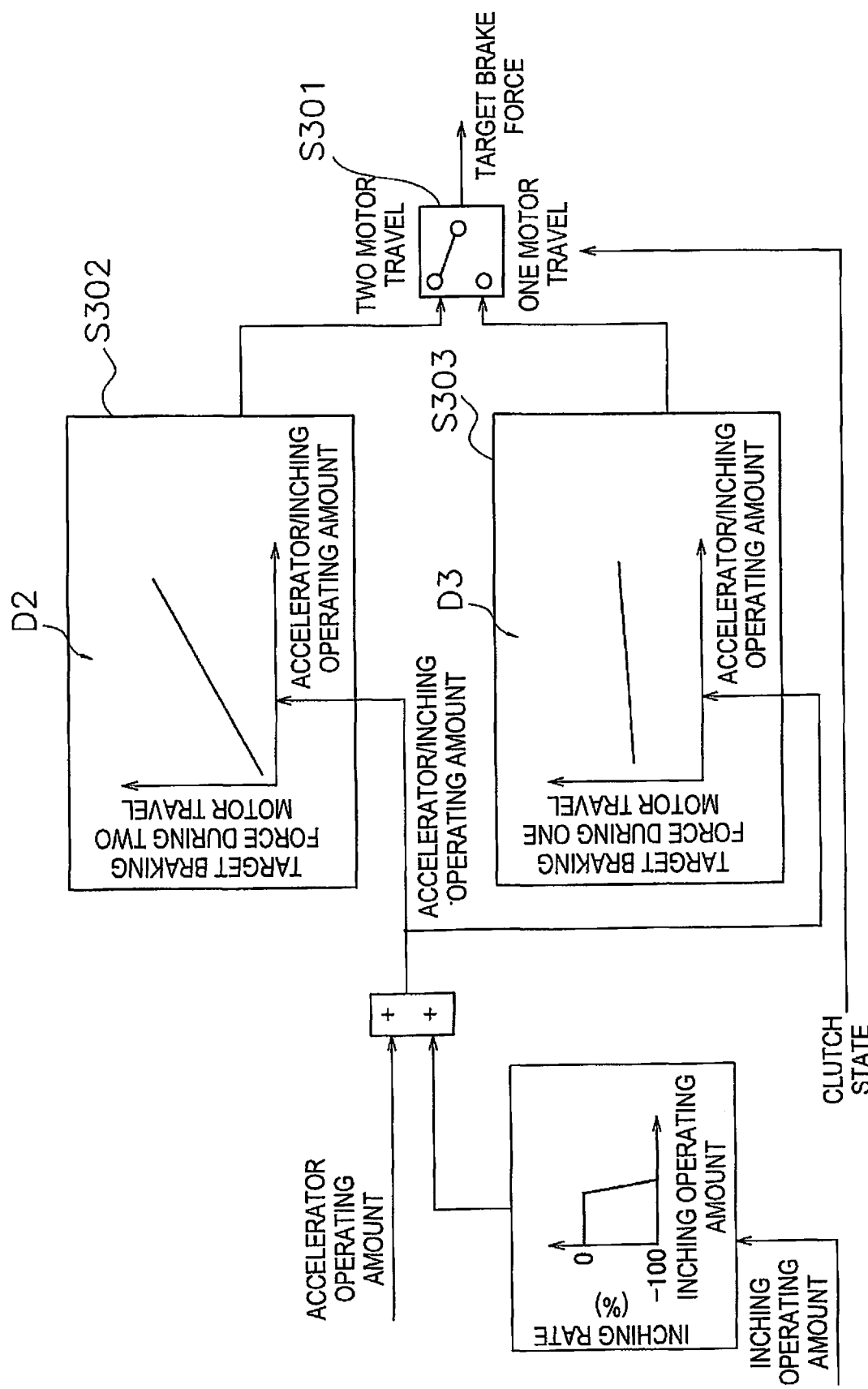
FIG. 15 illustrates processing for determining the target braking force during the shuttle motion according to another embodiment.
Figure 16:
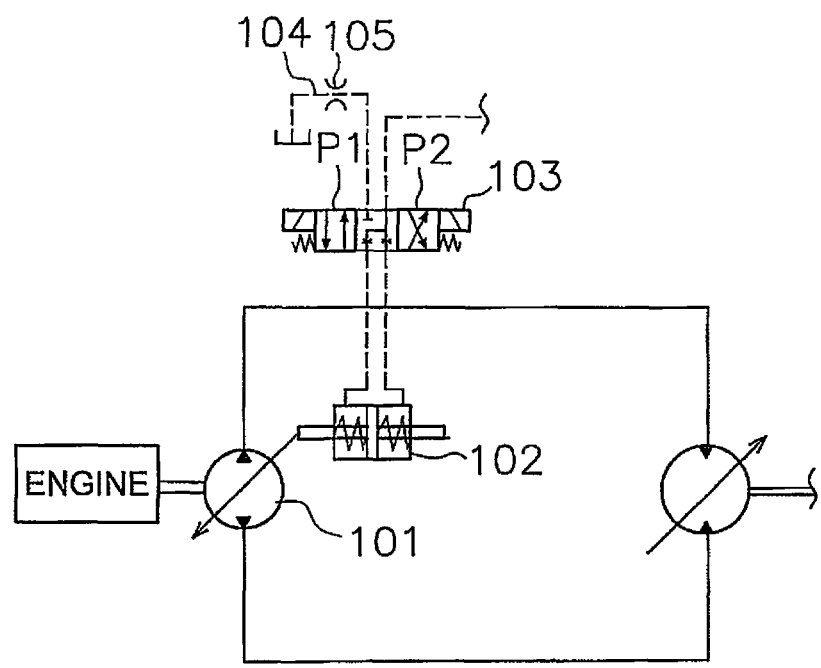
FIG. 16 illustrates a portion of a drive system of a work vehicle according to the prior art.

The controller 72 may use the inching operating amount in the calculation of the target braking force. Alternatively, the controller 72 may use both the accelerator operating amount and the inching operating amount to calculate the target braking force. Specifically as illustrated in FIG. 15, the controller 72 determines an accelerator/inching operating amount that takes into account the inching operating amount, based on the accelerator operating amount and the inching operating amount.

The controller 72 may determine an inching ratio that decreases in response to an increase in the inching operating amount. The controller 72 may determine the accelerator/inching operating amount by adding an inching rate to the accelerator operating amount. The controller 72 may calculate the target braking force from the accelerator/inching operating amount with the same processing as the above-mentioned steps S301 to S303. In this case, the target braking force is set to be smaller when the accelerator operation and the inching operation are performed at the same time in comparison to when only the accelerator operation is performed. As a result, a braking sense can be set more intuitively in the work vehicle 1 during the shuttle motion.

According to the present invention, motions of the vehicle that conform to the intent of the operator can be achieved with accuracy while suppressing the generation of shock during a shuttle motion.

What is claimed is:

1. A work vehicle comprising:
   an engine;
   a travel pump configured to be driven by the engine;
   a hydraulic circuit connected to the travel pump;
   a travel motor connected to the travel pump through the hydraulic circuit;
   a forward/reverse travel operating member;
   a forward/reverse travel operating sensor configured to output a signal indicative of an operating position of the forward/reverse travel operating member;
   a traveling direction sensor configured to output a signal indicative of an actual traveling direction of the work vehicle; and
   a controller configured to control the travel pump and the travel motor, the controller being configured to
     receive the signals from the forward/reverse travel operating sensor and the traveling direction sensor,
     determine whether the work vehicle is in a shuttle motion from the operating position of the forward/reverse travel operating member and the actual traveling direction of the work vehicle,
     determine a target braking force when the work vehicle is in the shuttle motion, the target braking force being a target value for the total deceleration-inducing force acting on the work vehicle,
     store a displacement instruction of the travel pump at a starting time of the shuttle motion,
     determine a pump target displacement of the travel pump and a motor target displacement of the travel motor based on the target braking force, the pump target displacement being determined by reducing the displacement instruction of the travel pump at the starting time of the shuttle motion in accordance with the target braking force and an elapsed time from the starting time of the shuttle motion, and
     control the travel pump and the travel motor to the pump target displacement and the motor target displacement, respectively.

2. The work vehicle according to claim 1, further comprising:
   an accelerator operating member; and
   an accelerator operating sensor configured to output a signal indicative of an operating amount of the accelerator operating member,
   the controller being further configured to
     receive a signal from the accelerator operating sensor, and
     determine the target braking force in response to the operating amount of the accelerator operating member.

3. The work vehicle according to claim 2, wherein
   the controller is further configured to refer to target braking data to determine the target braking force from the operating amount of the accelerator operating member, the target braking data defining a relationship between the operating amount of the accelerator operating member and the target braking force.

4. The work vehicle according to claim 1, wherein
   the controller is further configured to
     receive a signal indicating an actual vehicle speed,
     determine a target vehicle speed during the shuttle motion from the elapsed time from the starting time of the shuttle motion, the actual vehicle speed, and the target braking force,
     calculate a vehicle speed ratio by dividing the target vehicle speed by the actual vehicle speed, and
     reduce the displacement instruction by multiplying the displacement instruction by the vehicle speed ratio.

5. The work vehicle according to claim 4, wherein
   the controller is further configured to bring the target vehicle speed during the shuttle motion close to zero in response to the elapsed time from the starting time of the shuttle motion.

6. The work vehicle according to claim 1, wherein
   the travel pump includes a first pump port and a second pump port,
   the travel motor includes a first motor port and a second motor port, and
   the hydraulic circuit includes a first circuit connecting the first pump port and the first motor port, and a second circuit connecting the second pump port and the second motor port, and
   the work vehicle further comprises:
   a first pressure sensor configured to output a signal indicative of a hydraulic pressure in the first circuit; and a second pressure sensor configured to output a signal indicative of a hydraulic pressure in the second circuit, the controller being further configured to
receive the signal from the first pressure sensor and the signal from the second pressure sensor,
acquire an actual differential pressure between the first circuit and the second circuit from the signal from the first pressure sensor and the signal from the second pressure sensor, and
determine the motor target displacement from the target braking force and the actual differential pressure.

7. The work vehicle according to claim 1, wherein
the controller is further configured to
receive a signal indicating an actual vehicle speed, and
reduce the target braking force in response to a drop in the actual vehicle speed.

8. The work vehicle according to claim 7, wherein
the controller is further configured to refer to braking upper limit data to determine an upper limit of the target braking force from the actual vehicle speed, the braking upper limit data defining a relationship between the actual vehicle speed and the upper limit of the target braking force.

9. The work vehicle according to claim 1, wherein
the controller is further configured to determine that the work vehicle is in the shuttle motion when the operating position of the forward/reverse travel operating member and the actual traveling direction of the work vehicle do not match.

10. The work vehicle according to claim 1, further comprising:
an inching operating member; and
an inching operating sensor configured to output a signal indicative of an operating amount of the inching operating member,
the controller being further configured to
receive the signal from the inching operating sensor, and
determine the target braking force in response to the operating amount of the inching operating member.

11. The work vehicle according to claim 10, wherein
the controller is further configured to refer to target braking data to determine the target braking force from the operating amount of the inching operating member, the target braking data defining a relationship between the operating amount of the inching operating member and the target braking force.

12. A method executed by a controller in order to control a work vehicle, the work vehicle comprising an engine, a travel pump configured to be driven by the engine, a hydraulic circuit connected to the travel pump, a travel motor connected to the travel pump through the hydraulic circuit, and a forward/reverse travel operating member, the method comprising:
receiving a signal indicative of an operating position of the forward/reverse travel operating member;
receiving a signal indicative of an actual traveling direction of the work vehicle;
determining that the work vehicle is in a shuttle motion from the operating position of the forward/reverse travel operating member and the actual traveling direction of the work vehicle;
determining a target braking force when the work vehicle is in the shuttle motion, the target braking force being a target value for the total deceleration-inducing force acting on the work vehicle;
storing a displacement instruction of the travel pump at a starting time of the shuttle motion;
determining a pump target displacement of the travel pump and a motor target displacement of the travel motor based on the target braking force, the pump target displacement being determined by reducing the displacement instruction of the travel pump at the starting time of the shuttle motion in accordance with the target braking force and an elapsed time from the starting time of the shuttle motion; and
controlling the travel pump and the travel motor to the pump target displacement and the motor target displacement, respectively.

\* \* \* \* \*